United States Patent [19]
Masreliez et al.

[11] Patent Number: 5,894,678
[45] Date of Patent: Apr. 20, 1999

[54] ELECTRONIC LINEAR TAPE MEASURE USING A LOW POWER INDUCED CURRENT POSITION TRANSDUCER

[75] Inventors: Karl G. Masreliez, Bellevue; Nils Ingvar Andermo; Kim W. Atherton, both of Kirkland, all of Wash.

[73] Assignee: Mitutoyo Corporation, Kawasaki, Japan

[21] Appl. No.: 08/790,459

[22] Filed: Jan. 29, 1997

[51] Int. Cl.$^6$ .............................. G01B 3/10; G01B 7/02
[52] U.S. Cl. .................... 33/762; 33/762; 33/706
[58] Field of Search .................... 33/762, 763, 706, 33/707, 708, 755; 324/207.16, 207.24

[56] References Cited

U.S. PATENT DOCUMENTS 5,287,630  2/1994  Geisler .................... 33/707

*Primary Examiner*—Christopher W. Fulton
*Attorney, Agent, or Firm*—Oliff & Berridge, PLC

[57] ABSTRACT

An electronic linear tape measure using a low power induced current position transducer. The tape measure includes an enclosure case with a lateral slot through which the tape blade can be pulled. The tape blade is wound inside the enclosure case on a tape reel which is mounted on an axis support that has a spring loaded rewind mechanism. Also included are a tape lock, a keypad for various functions, and a conventional LCD display for displaying measured lengths. The signal processing and display electronics of the electronic tape measure are connected to the active portion of the transducer. The display provides an indication of the relative position between the elements of the transducer that coincides with the length of tape that has been pulled from the enclosure case. The relatively insensitive nature of the low power induced current position transducer to contaminants, tape damage and mechanical shock allows construction of an electronic tape measure with the preferred, historically proven, form that functions with greatly improved reliability when operating in a traditional environment. Additionally, the low power consumption of the induced current position transducer significantly increases the practicality of an electronic tape measure.

48 Claims, 18 Drawing Sheets

FIG. 6

| CODE | POS# | CODE | POS# | CODE | POS# | CODE | POS# | CODE | POS# | CODE | POS# |
|---|---|---|---|---|---|---|---|---|---|---|---|
| 0 | 0 | 43 | 141 | 87 | 209 | 130 | 20 | 174 | 210 | 217 | 188 |
| 1 | 1 | 44 | 55 | 88 | 56 | 131 | 36 | 175 | 224 | 218 | 220 |
| 2 | 2 | 45 | 149 | 89 | 144 | 132 | 44 | 176 | 57 | 219 | 231 |
| 3 | 13 | 46 | 94 | 90 | 150 | 133 | 52 | 177 | 113 | 220 | 179 |
| 4 | 3 | 47 | 157 | 91 | 217 | 134 | 60 | 178 | 145 | 221 | 239 |
| 5 | 21 | 48 | 17 | 92 | 95 | 135 | 68 | 179 | 189 | 222 | 234 |
| 6 | 14 | 49 | 81 | 93 | 211 | 136 | 8 | 180 | 151 | 223 | 243 |
| 7 | 37 | 50 | 102 | 94 | 158 | 137 | 76 | 181 | 221 | 224 | 251 |
| 8 | 4 | 51 | 165 | 95 | 225 | 138 | 84 | 182 | 218 | 225 | 42 |
| 9 | 45 | 52 | 63 | 96 | 18 | 139 | 92 | 183 | 232 | 226 | 74 |
| 10 | 22 | 53 | 169 | 97 | 58 | 140 | 100 | 184 | 96 | 227 | 98 |
| 11 | 53 | 54 | 110 | 98 | 82 | 141 | 108 | 185 | 180 | 228 | 130 |
| 12 | 15 | 55 | 177 | 99 | 114 | 142 | 116 | 186 | 212 | 229 | 138 |
| 13 | 61 | 56 | 40 | 100 | 103 | 143 | 124 | 187 | 240 | 230 | 162 |
| 14 | 38 | 57 | 136 | 101 | 146 | 144 | 49 | 188 | 159 | 231 | 182 |
| 15 | 69 | 58 | 118 | 102 | 166 | 145 | 105 | 189 | 235 | 232 | 120 |
| 16 | 9 | 59 | 185 | 103 | 190 | 146 | 28 | 190 | 226 | 233 | 196 |
| 17 | 5 | 60 | 71 | 104 | 64 | 147 | 132 | 191 | 244 | 234 | 206 |
| 18 | 46 | 61 | 193 | 105 | 152 | 148 | 31 | 192 | 252 | 235 | 214 |
| 19 | 77 | 62 | 126 | 106 | 170 | 149 | 140 | 193 | 19 | 236 | 187 |
| 20 | 23 | 63 | 201 | 107 | 222 | 150 | 148 | 194 | 43 | 237 | 230 |
| 21 | 85 | 64 | 11 | 108 | 111 | 151 | 156 | 195 | 59 | 238 | 238 |
| 22 | 54 | 65 | 35 | 109 | 219 | 152 | 80 | 196 | 75 | 239 | 242 |
| 23 | 93 | 66 | 51 | 110 | 178 | 153 | 164 | 197 | 83 | 240 | 250 |
| 24 | 16 | 67 | 67 | 111 | 233 | 154 | 168 | 198 | 99 | 241 | 73 |
| 25 | 101 | 68 | 7 | 112 | 41 | 155 | 176 | 199 | 115 | 242 | 129 |
| 26 | 62 | 69 | 91 | 113 | 97 | 156 | 135 | 200 | 104 | 243 | 161 |
| 27 | 109 | 70 | 107 | 114 | 137 | 157 | 184 | 201 | 131 | 244 | 195 |
| 28 | 39 | 71 | 123 | 115 | 181 | 158 | 192 | 202 | 139 | 245 | 205 |
| 29 | 117 | 72 | 48 | 116 | 119 | 159 | 200 | 203 | 147 | 246 | 229 |
| 30 | 70 | 73 | 27 | 117 | 213 | 160 | 34 | 204 | 163 | 247 | 237 |
| 31 | 125 | 74 | 30 | 118 | 186 | 161 | 66 | 205 | 167 | 248 | 249 |
| 32 | 10 | 75 | 155 | 119 | 241 | 162 | 90 | 206 | 183 | 249 | 128 |
| 33 | 50 | 76 | 79 | 120 | 72 | 163 | 122 | 207 | 191 | 250 | 204 |
| 34 | 6 | 77 | 175 | 121 | 160 | 164 | 26 | 208 | 65 | 251 | 228 |
| 35 | 106 | 78 | 134 | 122 | 194 | 165 | 154 | 209 | 121 | 252 | 248 |
| 36 | 47 | 79 | 199 | 123 | 236 | 166 | 174 | 210 | 153 | 253 | 203 |
| 37 | 29 | 80 | 33 | 124 | 127 | 167 | 198 | 211 | 197 | 254 | 247 |
| 38 | 78 | 81 | 89 | 125 | 227 | 168 | 88 | 212 | 171 | 255 | 246 |
| 39 | 133 | 82 | 25 | 126 | 202 | 169 | 172 | 213 | 207 | | |
| 40 | 32 | 83 | 173 | 127 | 245 | 171 | 208 | 214 | 215 | | |
| 41 | 24 | 84 | 87 | 128 | 253 | 172 | 143 | 215 | 223 | | |
| 42 | 86 | 86 | 142 | 129 | 12 | 173 | 216 | 216 | 112 | | |

FIG. 7

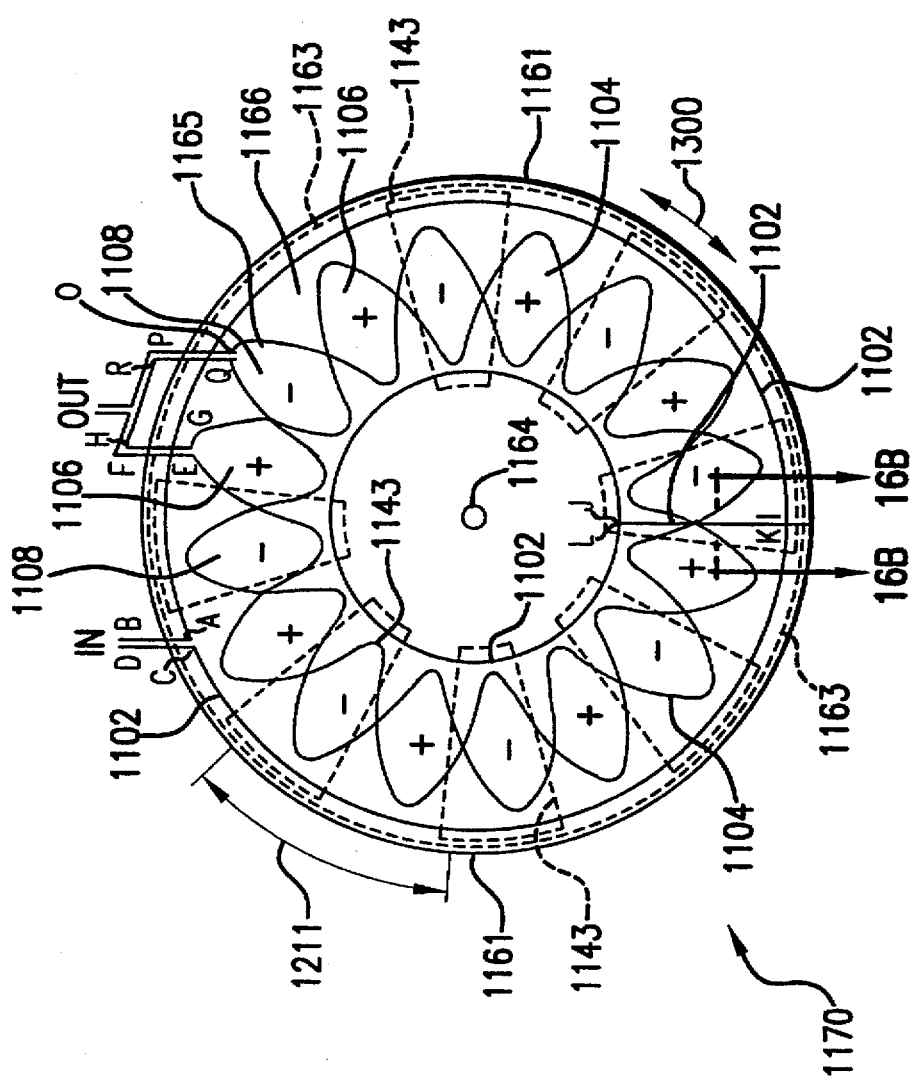

1

ELECTRONIC LINEAR TAPE MEASURE USING A LOW POWER INDUCED CURRENT POSITION TRANSDUCER

BACKGROUND OF THE INVENTION

1. Field of the Invention

This invention relates to electronic linear tape measures or rules. More particularly, this invention relates to a low cost and contamination resistant electronic tape measure which digitally displays a length measured by its tape.

2. Description of the Related Art

Electronic tape measures have been known and available for a number of years. In many such devices, the length measured is determined by mechanically or optically tracking the length of a tape unwound from a rotating take-up reel located within a case of the tape measure. In tape measures using incremental systems, electrical pulses are generated as the tape is unwound from the take-up reel. The counted number of pulses correspond to the length of tape unwound from the take-up reel. The pulses are counted and the measured length is displayed on the display.

The counting function may be implemented by an encoder. Such an encoder may be provided on the take-up reel, for example, by mechanical contacts defining multiple rotary switches coupled to the motion of the take-up reel.

These known measuring devices, although capable of providing measurement readings at reasonably precise intervals, require close tolerances and relatively expensive parts to accurately convert the linear motion of the tape to a corresponding rotation of the rotary transducers. Furthermore, these known measuring devices tend to be unreliable and inaccurate when subjected to a mechanical shock. In these known measuring devices, mechanical shock can result in missed or spurious pulses. In a purely incremental system, missed or spurious pulses cannot be corrected.

Using the tape blade to encode absolute displacement data and to employ various optical readers to read the encoded data on the tape blade is also known. However, using photosensors to read absolute displacement data printed on a tape also involves problems, such as providing sufficient light, the high power consumption of the optical readers, mechanical damage to the displacement data on the tape surface, and/or contamination by dirt, grease and the like. Mechanical damage and contamination occur frequently under normal use. Such damage and contamination render these optically encoded devices highly unreliable for the most common uses of these tape measures.

In addition, some of the known electronic measuring devices that employ optical techniques have absolute displacement data imprinted on the tape surface. The absolute displacement data is provided by reflective and non-reflective bar-code elements. These previously known devices use multiple component optical technology and high resolution optical elements for reading the coded tapes. These optical elements require the coded tape to be precisely printed and are complicated to assembly. As a result, these measurement devices are expensive and difficult to manufacture.

Another approach, which combines certain methods of incremental and absolute optical encoding, is described in U.S. Pat. No. 5,027,526 to Crane. Crane uses an optical encoder that provides absolute position readings in combination with an incremental encoder. The incremental encoder provides updated measurements between the absolute position measurements. This absolute encoder corrects for missed or spurious pulses generated by the incremental encoder at certain intervals. The incremental encoder outputs position information frequently enough for the desired resolution of a conventional tape measure. Crane also teaches conserving power by performing the spaced absolute encoder readings using the high-power optical sensor only when a designated pulse is received from the incremental encoder.

U.S. Pat. No. 4,638,250 to Shen-Orr et al. discloses a contactless position sensor with a coreless coil coupling component. The inductive position transducer assembly includes a magnetic field generator and sensor which create and receive a magnetic field coupled to a loop. The displacement of the coupling coil varies the degree of coupling between the transmitter and the receiver such that the magnitude of the induced electrical current indicates the location of the loop relative to the read head.

However, systems such as those described by Crane and Shen-Orr are also subject to mechanical damage and contamination that prevent accurate absolute measurement optical readings. Also, such systems are not truly absolute, since they rely on spaced absolute measurement readings. That is, these systems require a tape displacement sufficient to scan the absolute symbols. Additionally, the high-power optical sensor is a significant power drain on a conventional power source for a hand-held tape measure, even when such sensors are only intermittently used.

An electronic tape measure is needed that: 1) is insensitive to contaminants such as oil and ferromagnetic particles; 2) consumes low amounts of power; 3) is accurate; and 4) is inexpensive to manufacture. An electronic tape measure providing at least these four benefits has until now been unavailable.

SUMMARY OF THE INVENTION

This invention provides an inexpensive electronic tape measure that includes a digital display of a length measured by its tape. This invention uses a low-power encoding method that is relatively insensitive to contaminants.

This invention further provides a tape measure that is readable by both machines and humans and which substantially retains the conventional form, operation, feel and inexpensive manufacturing costs of conventional tape measures.

This invention additionally meets these objectives with few parts and with a simple assembly method.

These and other objects of the invention are provided by an electronic tape measure that uses a novel low power induced current position transducer. The tape measure has an enclosure case with a lateral slot through which the measuring tape blade is pulled. The tape blade is wound inside the enclosure case on a tape reel that is mounted on an axis support that has a spring loaded rewind mechanism. A tape lock may prevent the tape from moving further out of or into the enclosure case once a desired section of the tape has been pulled from the case. A keypad implements various functions, such as whether to display measured lengths in metric or feet and inches. A conventional LCD displays measured lengths.

The signal processing electronics of the electronic tape measure of this invention are connected to an active portion of a transducer that measures displacement between a read head and the tape blade. The measured displacement coincides with the length of tape which has been pulled from the enclosure case. The position information is encoded on the tape blade with flux modulators or modulator elements. Flux modulators can include both flux disrupters and flux enhancers. Flux disrupters are formed of a patterned film of a highly conductive material. Flux enhancers are formed of a material that is more magnetically permeable than the base material of the tape blade.

Although one embodiment of the electronic tape measure of this invention uses both absolute and incremental position data encoded on the measuring tape, it may also use other types of inductive transducers which are similarly accurate, consume low amounts of power, are inexpensive to manufacture, and are insensitive to contaminants.

Until this invention, which relies on the transducers and signal processing systems disclosed in copending U.S. patent applications Ser. No. 08/441,769 filed May 16, 1995, now abandoned in favor of pending continuation application Ser. No. 08/912,567, filed Aug. 18, 1997, Ser. Nos. 08/645,483; and 08/645,490, filed May 13, 1996, and Ser. Nos. 08/788,469 and 08/790,494, filed Jan. 29, 1997, each of which is commonly assigned and herein incorporated by reference, it was not believed possible to incorporate an inductive sensor with the necessary physical characteristics, accuracy, and low power consumption into a practical hand-held, battery-operated tape measure. This invention provides a major improvement in contamination resistance and overall reliability of measurement compared to previous tape measures.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein:

FIG. 6 shows a bit pattern defining unique 8 bit words for the absolute scale;

FIG. 7 shows a table which relates an absolute scale transducer position to each of the words that are defined by the bit pattern of FIG. 6;

FIG. 16A shows a winding layout of a third preferred embodiment of the electronic tape measure of this invention, comprising a second rotary encoder;

FIG. 16B is an enlarged cross-sectional view of the rotary encoder of FIG. 16A taken along the line 16B—16B;

DETAILED DESCRIPTION OF THE PREFERRED EMBODIMENTS

Figure 1:
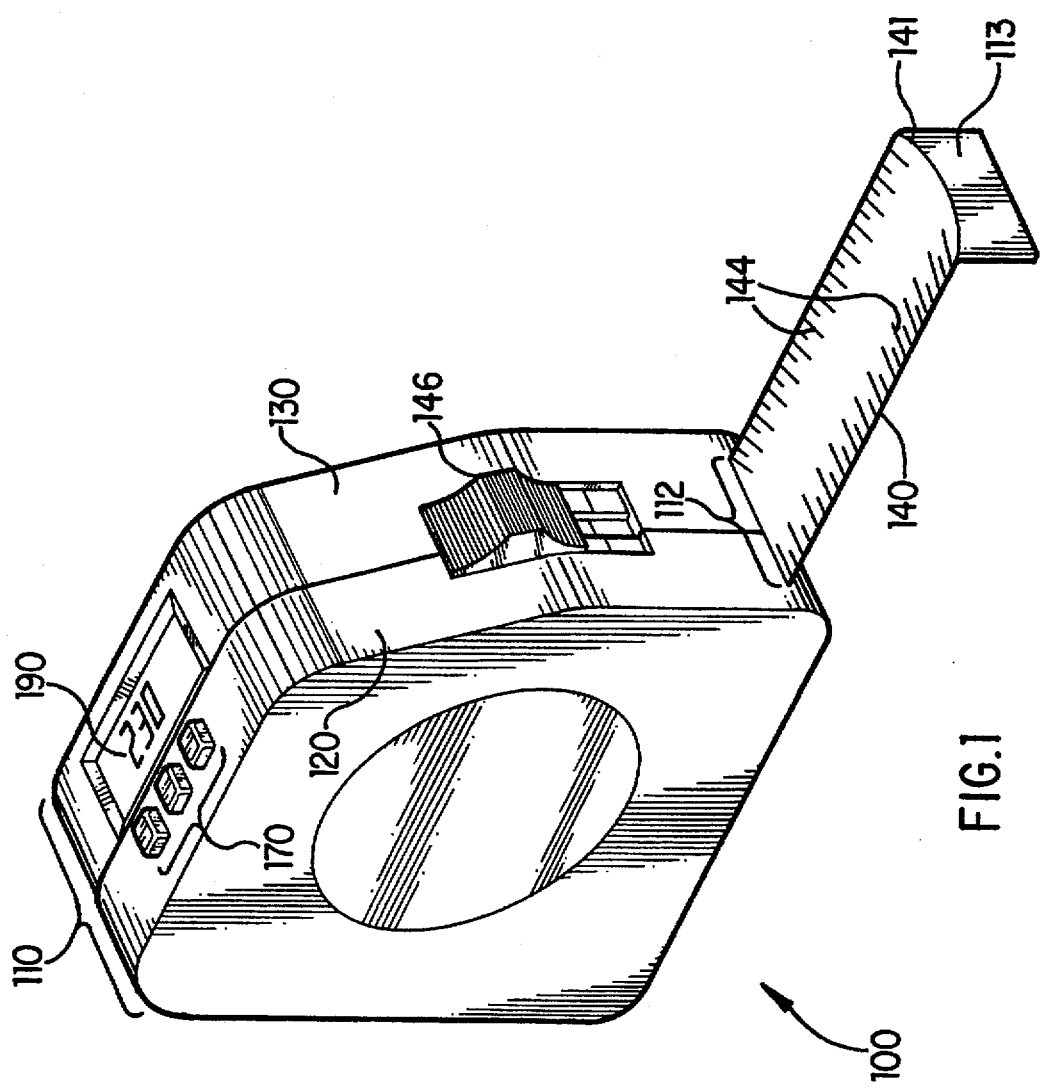
FIG. 1 is an external isometric view of a fist preferred embodiment of the electronic tape measure using a low power inductive position transducer.

An electronic tape measure 100 using a low power induced current position transducer is shown in FIG. 1. An enclosure case 110 includes case pieces 120 and 130, which are rigidly fastened to one another using conventional fastening techniques. A tape blade 140 measures distances. The tape blade 140 is pulled from the enclosure case 110 through a lateral slot 112. An end piece 113 of a tape end 141 of the tape blade 140 prevents the tape end 141 from retracting into the enclosure case 110 and provides a convenient finger grasp for pulling a section of the tape blade 140 from the enclosure case 110. The tape blade 140 is provided with standard, human-readable markings 144 printed along both sides of one surface of the tape blade 140.

Distances are measured by pulling the tape blade 140 from the enclosure case 110 and placing the tape end 141 and the enclosure case 110 at opposite ends of the distance being measured. A tape lock 146 prevents the tape blade 140 from moving further into or out of the enclosure case 110 once the tape blade 140 has been pulled from the enclosure case 110. Measurements are displayed on a conventional digital LCD display 190. A keypad 170 controls various functions (e.g., displaying measurements in metric or British units, or including the length of the enclosure case 110 in the measurement).

Figure 2:
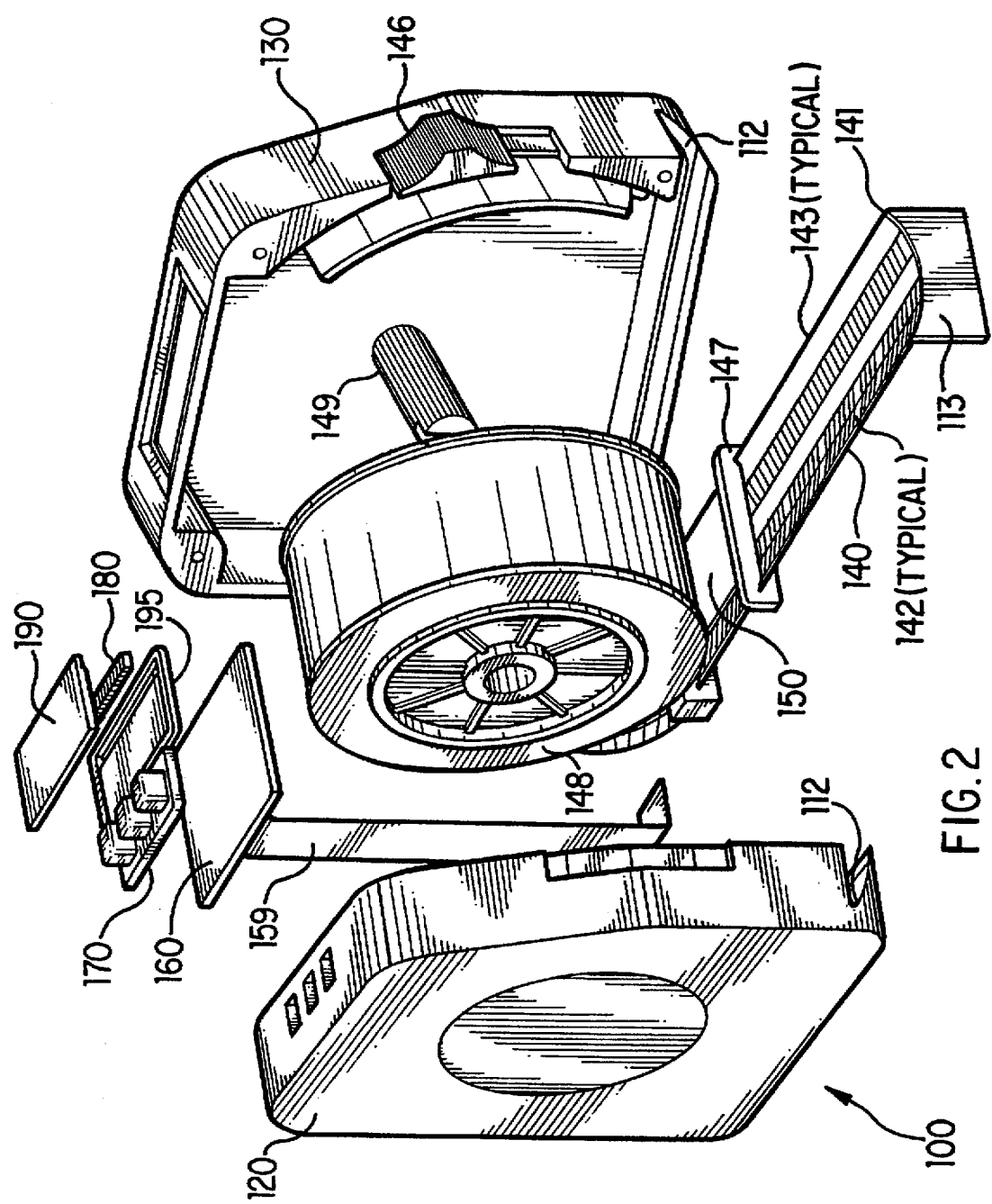
FIG. 2 is an exploded isometric view of the electronic tape measure of FIG. 1.

As shown in FIG. 2, the tape blade 140 is wound inside the enclosure case 110 on a tape reel 148. A tape end (not shown) of the tape blade 140 is rigidly attached to the tape reel 148. The tape reel 148 rotates on a tape reel support 149 that is attached to the case piece 130. The tape reel 148 and tape reel support 149 have a spring rewind mechanism (not shown) which rewinds the tape blade 140 back onto the tape reel 148. The tape blade 140 slides through a tape guide 147. The tape guide 147 also serves as a mount for an inductive read head 150.

As also shown in FIG. 2, the flux modulators 142 and 143 are attached to the tape blade 140. The flux modulators 142 and 143 cooperate with the inductive read head 150 as described in the incorporated copending applications.

A cable connector 159 connects the inductive read head 150 to the signal processing and display electronic circuit 160. A conventional elastomeric connector 180 connects the signal processing and display electronic circuit 160 to the display 190. A conventional elastomeric connector (not shown) connects the signal processing and display electronic circuit 160 to the keypad 170. A support seal 195 supports the display 190. The elements 160, 180, 190 and 195 may be compressed and mounted into an operable position by any of several conventional means, including fasteners or clips, or insertion into slots in the case elements 120 and 130.

Figure 3:
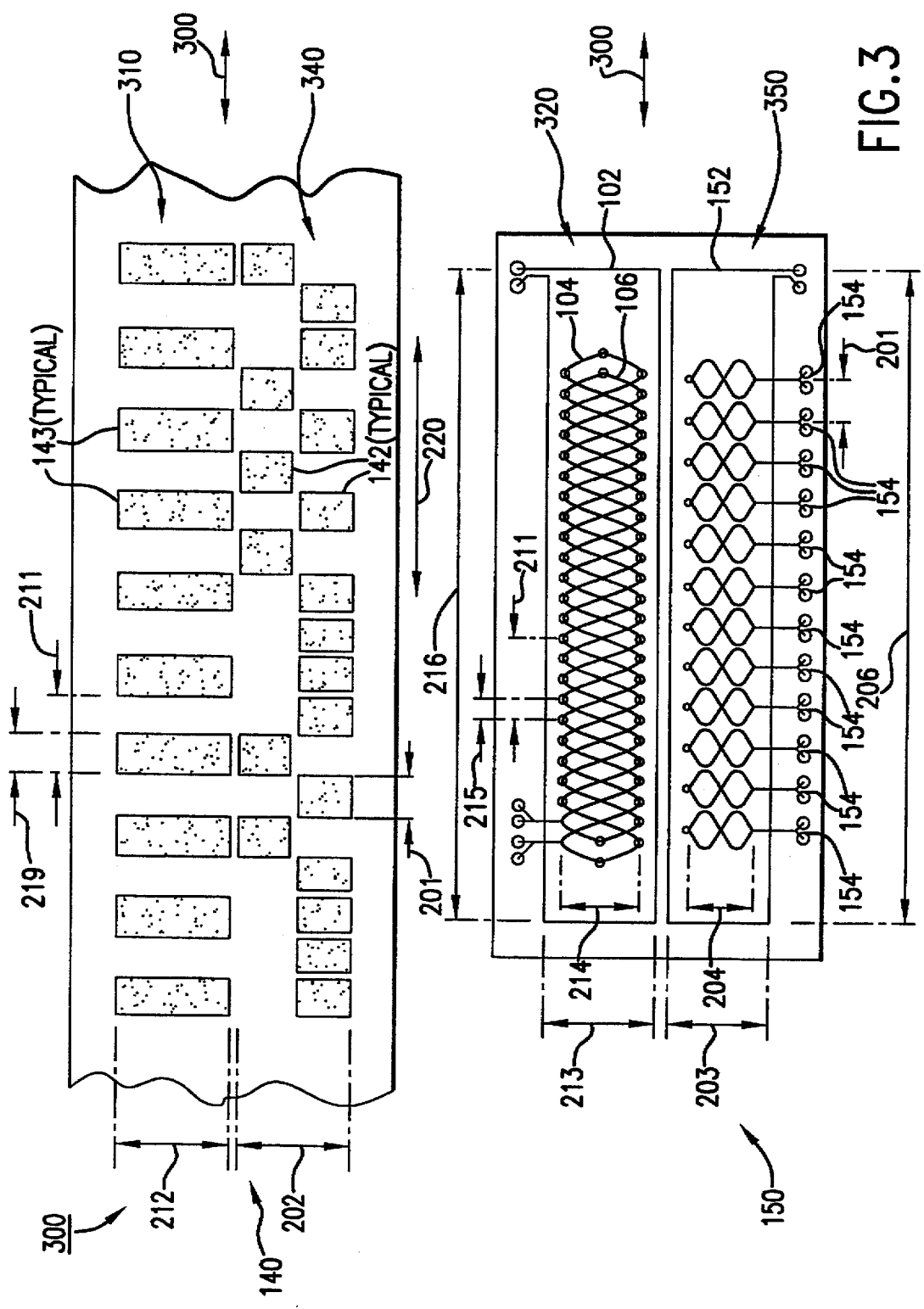
FIG. 3 shows a layout of the transmitter and receiver windings for a read head for an inductive transducer along with the corresponding modulator elements.

As shown in FIGS. 1–3, the read head 150 and the flux modulators 142 and 143 form an inductive measurement transducer 300. In particular, the flux modulators 143 form an incremental scale 310 while the transmitter winding 102 and the receiver windings 104 and 106 form an incremental read head 320. Together, the incremental scale 310 and the incremental read head 320 form an incremental transducer 330. Similarly, the flux modulators 142 form an absolute position code track 340, while the transmitter winding 152 and the receiver windings 154 form an absolute position read head 350. Together, the code track 340 and the absolute position read head 350 form an absolute position transducer 360. The output of the incremental transducer 320 is combined with the output of the absolute position transducer 360 to provide an overall absolute position measurement having the resolution of the incremental transducer.

FIG. 3 shows the inductive read head 150 and the flux modulators 142 and 143 in greater detail. The flux modulators 142 encode absolute position information at a first, relatively coarse, resolution. The flux modulators 143 encode the incremental position information at a second, relatively fine, resolution.

The portion of the read head 150 inductively coupled to the code track flux modulators 142 comprises thirteen substantially coplanar wire paths or windings. A transmitter winding 152 forms a large planar loop defining an absolute transducer flux region. Twelve receiver windings 154 are positioned within the absolute transducer flux region and are preferably in substantially the same plane as the transmitter winding 152. Each of the receiver windings 154 is formed by a pair of loops, where each loop is wound in opposite directions in each pair.

Figure 4:
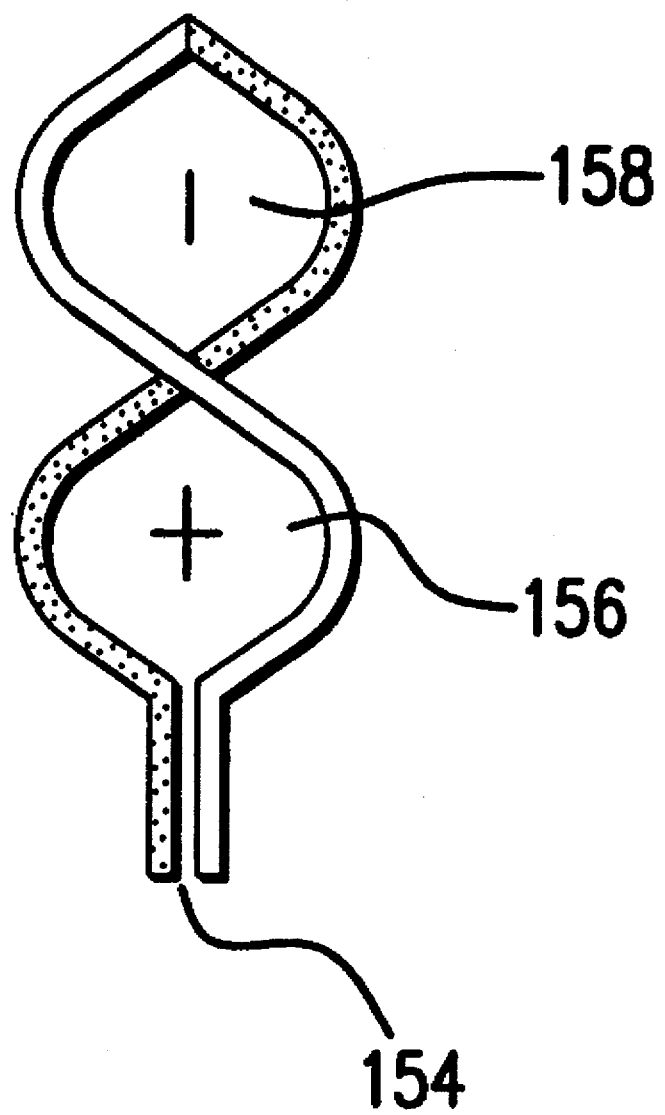
FIG. 4 shows the alternating loops of one of the absolute scale receiver windings of FIG. 3.

As shown in FIG. 4, receiver winding 154 are formed by laying out a piece of wire in one direction for one period of a zigzag or sinusoidal pattern, and then in a reverse direction so that the windings cross over themselves at an insulated cross-over. This forms alternating subloops 156 and 158. Alternatively, the subloops 156 and 1581 can be created by taking a loop of wire and twisting the wire clockwise or counter-clockwise 180 degrees once at the insulated cross-over of the loop. This is described in greater detail in incorporated copending applications JAO 38708 and JAO 36708A.

The positive polarity subloops 156 are designated with a "+", while the negative polarity subloops 158 are designated with a "−". The "+" and "−" polarities refer to the opposing nature of the signals induced in the corresponding subloops 156 and/or 158 by a magnetic field created by a current in the transmitter winding 152.

The distance measured between a point on one receiver winding 154 and a corresponding point on an adjacent receiver winding 154 is defined as a pitch or wavelength 201 of the receiver windings 154. The transmitter winding 152 has a length 206 along a measuring axis 220 of the tape blade 140 and a width 203 across the tape blade 140. The receiver windings 154 have a width 204. As shown in FIG. 3, the flux modulators 142 are positioned in an array at a pitch of one wavelength 201 along the tape blade 140. The flux modulators 142 are each placed within a width 202. When the flux modulators 142 and 143 act as flux disrupters 142 and 143, they are preferably formed of a highly electrically conductive material, which is also preferably a low permeability (non-ferromagnetic) material, so that they do not attract ferromagnetic particles. In one preferred embodiment, the disrupters are formed as highly conductive plated copper islands on a stainless steel or fiberglass tape. When the flux modulators 142 and 143 are flux enhancers, they are preferably formed of a highly magnetically permeable material.

The preferred values for the physical dimensions of the absolute position transducer 360 are:

Receiver winding bit pitch 201=2.54 mm
Flux modulator width 202=7.258 mm
Transmitter winding width 203=6.75 mm
Receiver winding width 204=4.1438 mm
Transmitter winding length 206=40.64 mm As shown in FIGS. 2 and 3, the signal processing and display electronic circuit 160 applies signals to the transmitter winding 152 of the read head 150 to generate a magnetic field that is modulated by the flux modulators 142. The modulated magnetic field induces a signal in the receiver windings 154 of the read head 150. The signals from the receiver windings 154 are communicated to the signal processing and display electronic circuit 160. The variously modulated phases or amplitudes of the signals, modulated by the flux modulators 142, indicates the absolute position of the absolute position code track 340 relative to the absolute position read head 350 to the first resolution, which depends on the pitch 201. This is described in greater detail in incorporated copending applications JAO 36708 and JAO 36708A. Thus, this defines the absolute position of the tape blade 140 relative to the enclosure case 110. Further details of the preferred low-power signal processing electronic circuit 160 are disclosed in the incorporated copending applications.

Figure 5:
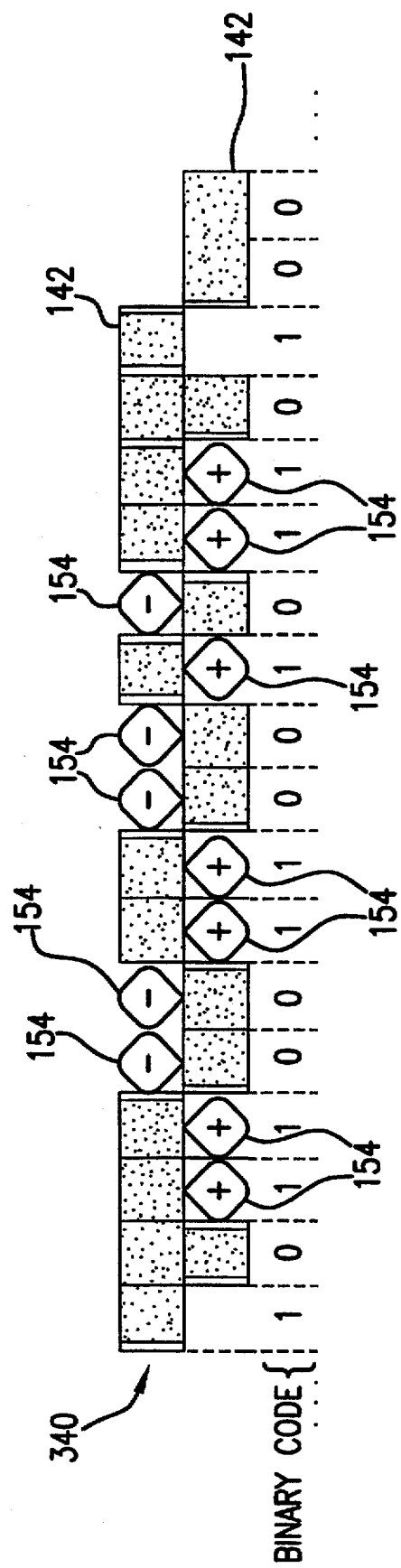
FIG. 5 shows alternating loops of the twelve absolute scale receiver windings of FIG. 3 with modulator elements and a corresponding binary word.

As the tape blade 140 moves relative to the read head 150, each of the receiver windings 154 has one flux modulator 142 covering one of its subloops 156 or 158, as shown in FIG. 5. FIG. 5 shows twelve receiver windings 154 and a plurality of flux modulators 142. The transmitter winding 152 of the absolute position read head 350 generates a magnetic field through the receiver windings 154 perpendicularly to the receiver windings 154. As previously described, each receiver winding 154 includes two subloops 156 and 158 that are wound in opposite directions to each other. As a result of this reversed winding, the voltages generated in the subloops 156 and 158 are of opposing polarity. Thus, each receiver winding 154 receives different signals from its subloops 156 and 158. In FIG. 5, the orientation of each subloop 156 is indicated with the "+" sign and the orientation of each subloop 158 is indicated with the "−" sign. The "+" signs for some of the subloops 156 and the "−" signs for some of the subloops 158-x are not visible in FIG. 5 because they are covered by the flux modulators 142. When the flux modulators 142 are absent, there is no output signal from the receiver windings 154 because the contribution to the output signal from the "+" 156 subloop balances the contribution from the "−" 158 subloop in each receiver windings 154.

When a single flux modulator 142 is present, the state of the output signal from the receiver winding 154 depends on which of the two subloops 156 or 158 is covered by the flux modulator 142. As shown in FIG. 5, when the flux modulators 142 modulate the signal from the positive polarity loops 156 and do not modulate the signal from the negative polarity loops 158, the signal processing and display electronics 160 interprets this as a logical "0" state. Conversely, when the flux modulators 142 modulate the signal from the negative polarity loop 158 and do not modulate the signal from the positive polarity loop 156, the signal processing and display electronics 160 interprets this as a logical "1" state. It should be appreciated that both types of flux modulators (i.e., flux disrupters and flux enhancers) can be used at the same time to enhance one of the subloops 156 or 158 and simultaneously disrupt the other of the subloops 156 or 158. In this case, enhancing the subloop 156 and disrupting the subloop 158 can be interpreted as a logical "0" and enhancing the subloop 158 and disrupting the subloop 156 can be interpreted as a logical "1", or vice versa. Thus, the output signal from a receiver winding 154 is designated as "1" when its negative polarity subloop 158 is covered by a flux modulator 142. Similarly, the signal from a receiver winding 154 is designated as a "0" when its positive polarity subloop 156 is covered by the flux modulator 142. In FIG. 5 the binary code output from the receiver windings 154 is shown below the windings 154.

Each of the "0"s or "1"s is offset from each other in a direction parallel to the measurement direction or axis 220. The twelve receiver windings 154 produce a twelve bit "code word". Using this configuration, the flux modulators 142 encode an absolute bit pattern along the tape blade 140 that indicates absolute positions along the tape blade 140.

Figure 6:
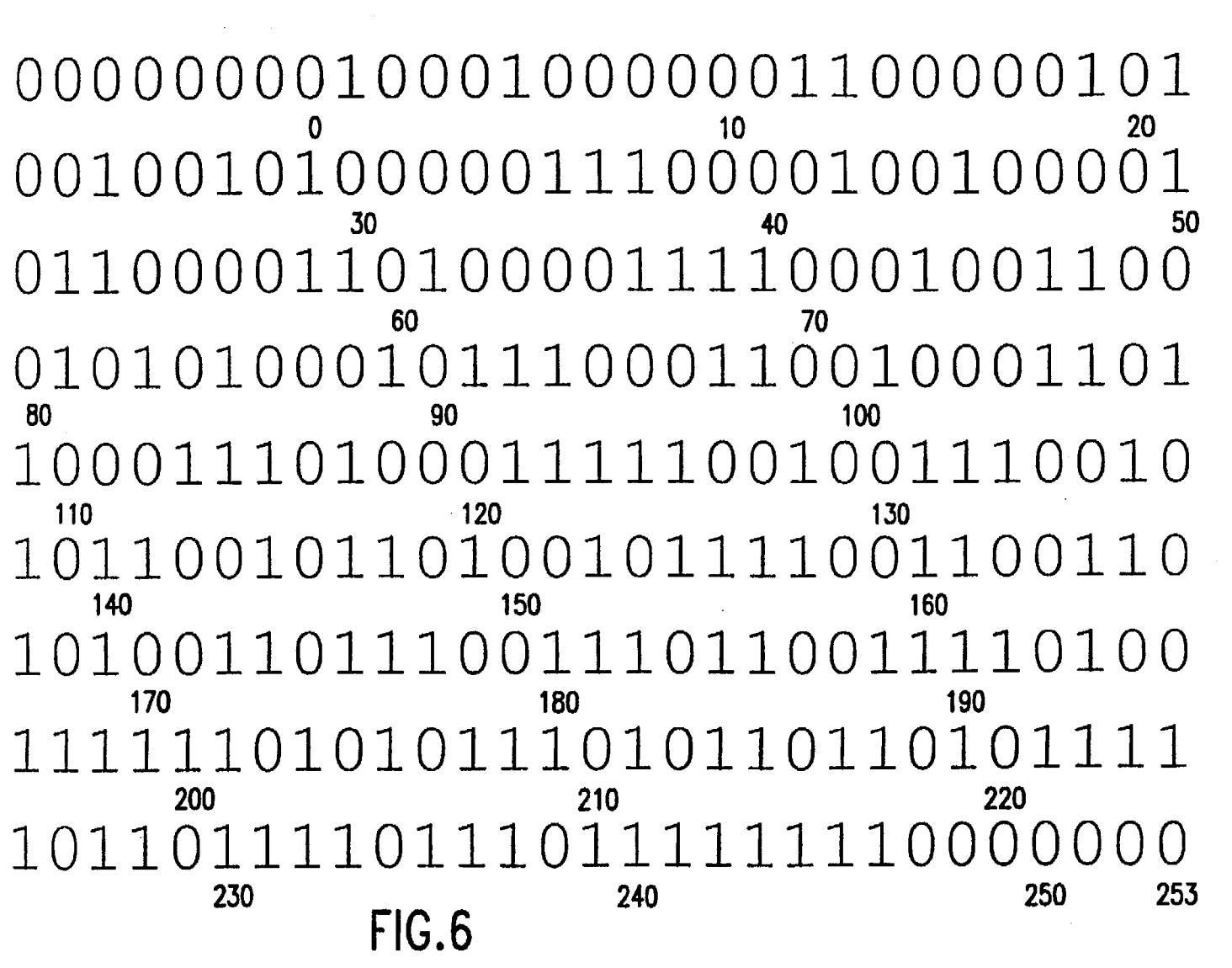

FIG. 6 shows a bit pattern defining 254 unique 8 bit code words (assuming the first 7 bits of the 254 bit pattern are "wrapped around" to repeat at the end of the pattern) with 254 corresponding unique positions when read by the absolute position read head 360 having eight receiver windings 154. Each code word corresponds to an absolute position along the tape blade 140 as shown in the table in FIG. 7.

Figure 8A:
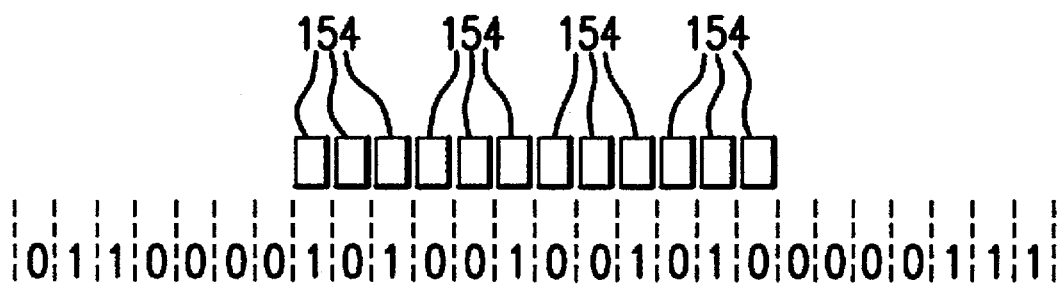
FIG. 8A shows modulator elements positioned relative to an inductive read head in an array encoding absolute position data.
Figure 8B:
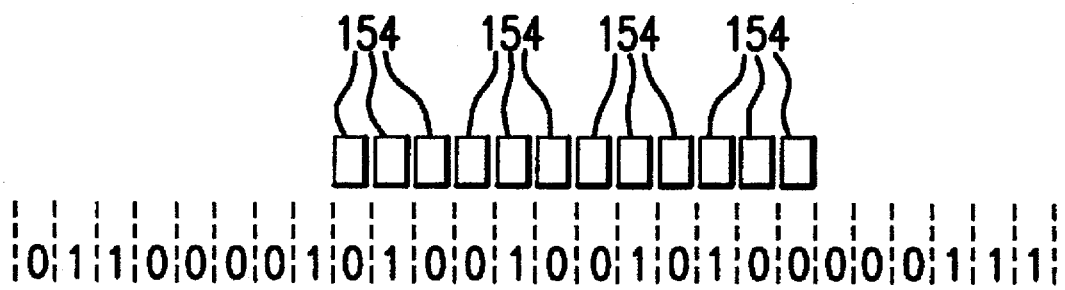
FIG. 8B shows the situation when the modulator elements of FIG. 8A have moved one bit to the left.
Figure 8C:
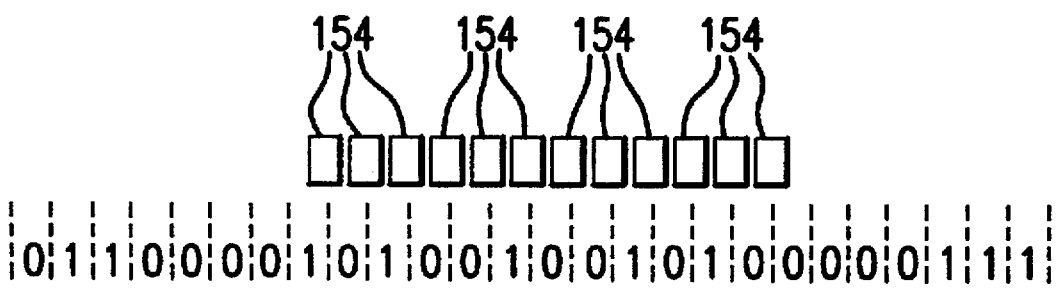
FIG. 8C shows the situation where the modulator elements have been moved to a position between that shown in FIG. 8A and that shown in FIG. 8B.
Figure 9:
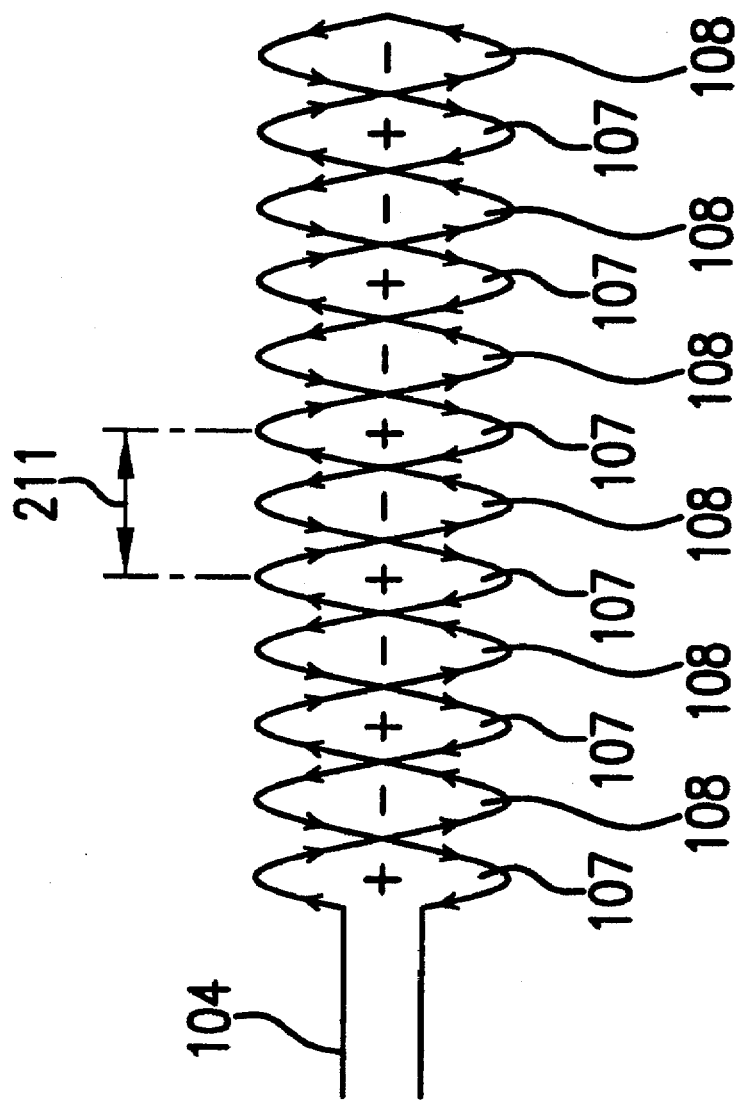
FIG. 9 shows the alternating loops of one of the incremental receiver windings on the read head of FIG. 3.

In FIG. 8A, the tape blade 140 is positioned relative to the read head 150 where the receiver windings 154 line up with the flux modulators 142 that form the 12-bit code word "101001001010". The receiver windings 154 of the read head 350 are shown representationally in FIG. 8A as blocks 154. The flux modulators 142 are shown representationally as "0"s and "1"s. FIG. 8B shows the situation when the tape blade 140 has moved one code bit to the left from the position shown in FIG. 8A. In FIG. 8B, the read head 350 reads "010010010100". FIG. 8C shows the read head in an intermediate position, between the positions shown in FIGS. 8A and 8B, where some of the bits become ambiguous or undefined because some of the receiver windings 154 are over both a "0" bit and a "1" bit. In FIG. 8C, the read head 350 reads "uuu0uu0uuuu0", where "u" stands for an undefined bit output from the corresponding receiver windings 154.

Even though some of the bits output from the receiver windings 154 are undefined in FIG. 8C, it is still possible to determine the absolute position from the clear "1"s or "0"s, that originate from two or more "1"s or "0"s in a row. In FIG. 8C, there are three clear "0"s. The methods for disambiguizing the undetermined code bits is fully set forth in incorporated copending applications JAO 36708 and JAO 36708A. Thus, these methods will not be further described herein.

Referring to FIG. 3, the flux modulators 143 of the incremental transducer 430 encode the incremental position information. The transmitter winding 102 forms a large planar loop defining an incremental flux region. The two receiver windings 104 and 106 are positioned within the incremental flux region, and are preferably positioned in substantially the same plane as the transmitter winding 102. The receiver windings 104 and 106 each includes a plurality of immediately adjacent alternating loops arranged in a sinusoidally-shaped pattern extending along the measurement axis 300. The receiver windings 104 and 106 are laid out in one direction in a zigzag or sinusoidal pattern, and then in a reverse direction so that the windings cross over themselves at insulated crossovers. The sinusoidal pattern of each incremental winding 104 and 106 forms alternating polarity loops 107 and 108. Alternatively, the alternating polarity loops 107 and 108 can be created by taking a large loop of wire and twisting the wire clockwise or counterclockwise 180 degrees at regular portions along the large loop.

The distance between two corresponding points on the receiver windings 104 or 106, i.e., the width of each pair of loops 107 and 108, is defined as the pitch or wavelength 211 of the receiver winding 104 and 106. The offset between corresponding loops 107 and 108 of the receiver windings 104 and 106 is equal to one-quarter wavelength 215. That is, the receiver windings 104 and 106 are in quadrature. The transmitter winding 102 has a length 216 and a width 213. The receiver windings 104 and 106 have a width 214. The quadrature relationship between the receiver winding 104 and 106 determines the direction of relative motion of the tape blade 140 relative to the read head 150, as an aid to position computation.

As shown in FIG. 3, the flux modulators 143 preferably have a length 219 that is equal to one-half of the wavelength 211 and are arranged at a pitch of one wavelength 211. The flux modulators 143 have a width 212.

The preferred values of the physical dimensions of the incremental position transducer 30 are:

Receiver winding wavelength 211=5.08 mm

Flux modulator width 212=7.258 mm

Transmitter winding width 213=6.75 mm

Receiver winding width 214=4.7208 mm

One-quarter receiver wavelength 215=1.27 mm

Transmitter winding length 216=40.64 mm

Flux modulator length 219=2.54 mm

The signal processing and display electronic circuit 160 applies drive signals to the transmitter winding 102 of the incremental read head 320 to generate a changing magnetic field that is modulated by the flux modulators 143. The modulated magnetic field induces signals in the receiver windings 104 and 106 of the read head 320. The signals from the receiver windings 104 and 106 of the read head 320 are then communicated to the signal processing and display electronic circuit 160. The modulated phase or amplitude of the signals induced in the receiver winding 104 and 106 indicates the incremental position of the flux modulators 143 relative to the incremental read head 320. Thus, the modulated signals indicate the relative position of the enclosure case 110 relative to the tape blade 140 within a fine wavelength. The relationship between the signals from each of the two receiver windings and their position within the wavelength 211 relative to the flux modulators 143 is described by the equation:

$$p = (\tan^{-1}(S_x/S_y))(\lambda/2\pi)$$

where:

p is the position within the wavelength 211, $S_v$ and $S_v'$ are the amplitudes of the outputs from the receiver windings 104 and 106, λ is the encoder wavelength 211 and the function $\tan^{-1}$ provides an angle between 0 and 2 π.

Further details of the preferred low-power signal processing electronics are disclosed in the incorporated copending applications Ser. Nos. 08/645,483 and 08/645,490. The signal processing and display electronic circuit 160 then sends signals to the display 190 to provide a digital readout of the measurement being made by the tape measure 100.

Figure 10:
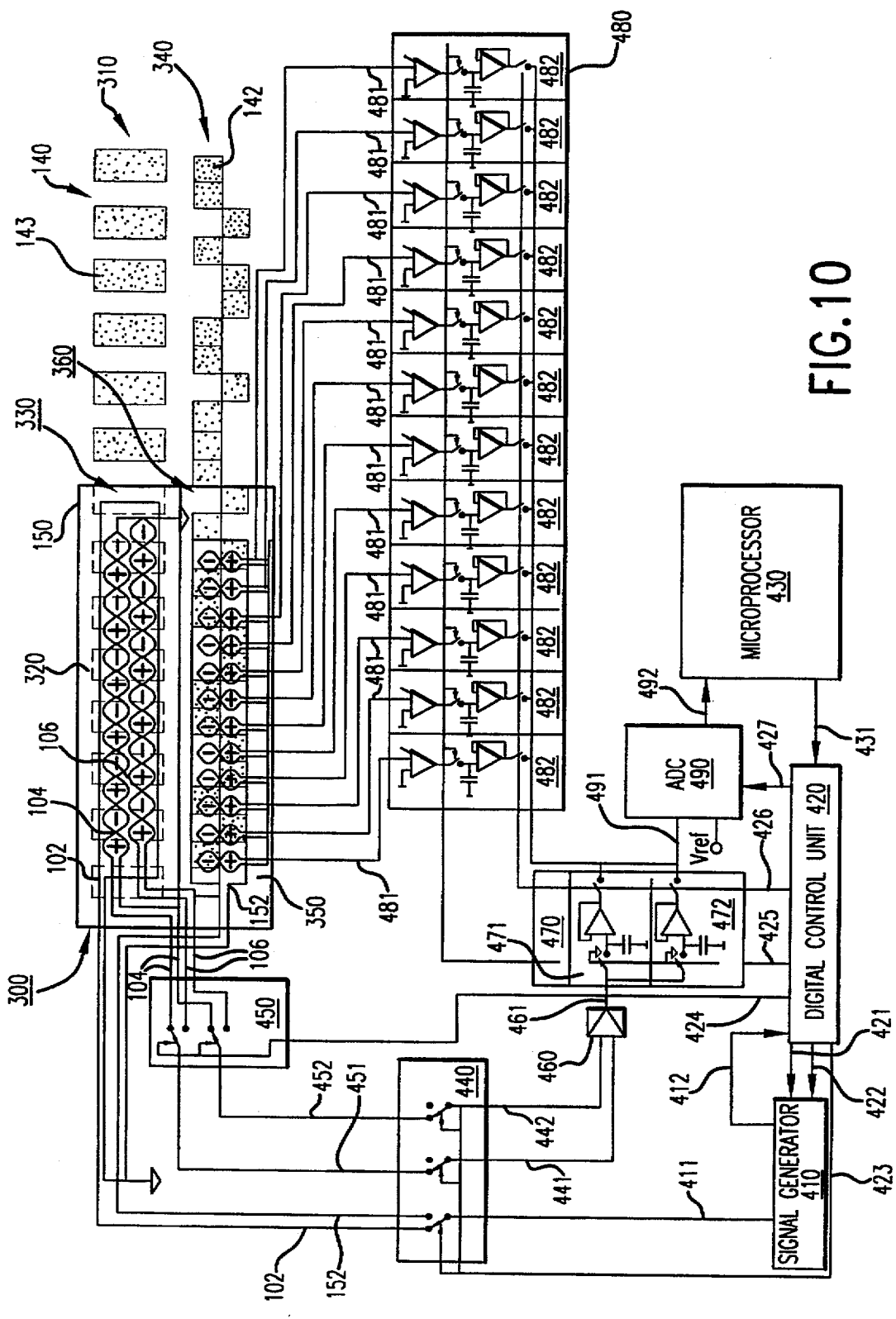
FIG. 10 shows a partial block, partial schematic view of the encoder electronics of one preferred embodiment of this invention.

FIG. 10 shows one preferred embodiment of the signal processing and display electronic circuit 160 of this invention. Other embodiments of the signal processing and display electronic circuit 160 are described in the incorporated copending applications Ser. Nos. 08/645,483, 08/645,490, JAO 36708 and JAO 36708A. The signal processing and display electronic circuit 160 includes a signal generator 410 that generates a high-frequency drive signal output on a signal line 411 controllably output to the transmitter windings 102 and 152. The signal generator 410 is controlled by control signals on the signal lines 421 and 422 from a digital control unit 420. The digital control unit 420 is controlled by a control signal on a signal line 431 from a microprocessor 430 and a control signal output on a signal line 412 output from the signal generator 410. The digital control unit 420 generates control signals output on the signal lines 421–427.

The drive signal output on the signal line 411 from the signal generator 410 goes to either the transmitter winding 102 or the transmitter winding 152, as controlled by the control signal 423, which operates the switch 440. The modulated output signals output by the receiver winding 104 and 106 of the incremental transducer 330 are input to a switch 450, which controllably connects one of the output signals to the signal lines 451 and 452. The position of the switch 450 controlled by a control signal output from the digital control unit 420 on the signal line 424. The switch 450 outputs the modulated output signal from either the receiver winding 104 or the receiver winding 106 to the switch 440 based on the position of the switch elements of the switch 450.

Based on the position of switch elements of the switch 440, the drive signal on the signal line 411 is connected to one of the transmitter windings 102 or 152. If the drive signal is connected to the transmitter winding 102 by the switch 440, the switch 440 also connects the signal lines 451 and 452 to the signal line 441 and 442 respectively. Otherwise, the signal line 441 and 442 are unconnected. The modulated output signals from one of the incremental receiver windings 104 or 106 on the signal lines 441 and 442 are amplified by a differential amplifier 460. The output of the differential amplifier 460 is output on the signal line 461, and is stored by the sample and hold circuit 470. The sample and hold circuit 470 includes a first sample and hold subcircuit 471 and a second sample and hold circuit 472. The first sample and hold subcircuit 471 stores the modulated output signal from the incremental receiver winding 104, while the second sample and hold subcircuit 472 stores the modulated output signal from the incremental receiver winding 106. The sample and hold circuit 470 is controlled by control signals output by the digital control unit 420 on the signal lines 425 and 426.

When the drive signal on the signal line 411 is connected to the transmitter winding 152 by the switch 440, a modulated signal is induced in the receiver windings 154. The modulated output signals output from the receiver windings 154 are input over the signal lines 481 to a sample and hold circuit 480, comprising a plurality of sample and hold subcircuits 482 equal to the number of receiver winding 154 of the absolute transducer 360. Each sample and hold subcircuit 482 stores the modulated output signal from one of the receiver windings 154. The sample and hold circuit 480 is also controlled by control signals output from the digital control unit 420 over the signal lines 425 and 426.

It is important to sample all of the signals within a short time interval, t1, if the tape blade 140 is moving with respect to the read head 150 during the measurement event. Therefore, all of the modulated output signals from the transducers 330 and 360 are stored in the sample and hold circuits 470 and 480, respectively, before any further signal processing is done. Once all of the modulated output signals have been stored in the sample and hold circuits 470 and 480, the stored signals are converted to digital signals. Each of the signals stored in the sample and hold circuits 470 and 480 are output to an analog-to-digital converter (ADC) 490 over a signal line 491. The control signal output by the digital control unit on the signal line 426 successively outputs the stored signals from the sample and hold subcircuits 471, 472 and 482 to the ADC converter 490 and are converted to a digital value. The ADC 490 is preferably a serial successive approximation type ADC. The conversion resolution of the ADC is controllable by a control signal output from the digital control unit 420 over the signal line 427, so the modulated output signals from the incremental transducer 330 can be converted at a higher resolution than the signals from the absolute position transducer 460, which do not need to be as precise. The total time for signal collection and A/D conversion is t2. Each of the converted signals is sent to the microprocessor 430 over a signal line 492 as it is converted.

Once the microprocessor 430 has received all the digital signals over the signal line 492 from the ADC 490, the incremental and absolute measurements are calculated. The incremental position within the fine wavelength is calculated as:

$$p = (\tan^{-1}(S_v/S_v'))(\lambda/2\,\pi)$$

where:

$S_v$ and $S_v'$ are the amplitudes of the outputs from the receiver windings 104 and 104';

λ is the encoder wavelength 211; and the function $\tan^{-1}$ provides an angle between 0 and 2 π.

As described earlier, some of the modulated output signals from the receiver windings 154 of the absolute position transducer 360 may be ambiguous, and the full binary code word may need to be derived by the microprocessor 430. The microprocessor 430 calculates the absolute position using the derived binary code word and a table similar to that shown in FIG. 7. Once both the incremental and absolute positions have been calculated, the microprocessor 430 outputs the appropriate signals to the display 190 to display the position measurement.

The code track 340 on the tape blade 140, formed by the flux modulators 143, will, with a twelve bit codeword length, cover a range of $(4096)(\lambda_1/2) = (4096)(5.12\text{ mm}/2) = 10{,}486$ mm, if the incremental wavelength, $\lambda_1 = 5.12$ mm = wavelength 211. Longer or shorter ranges can be covered by having a longer or shorter codeword. For instance, a codeword-length of 10 bits would give a range of 2.62 m. The read head 150 would also have more or less receiver loops 154 to read the longer or shorter codewords.

The above described system with 12 receiver loops 154 can also be used for longer code words and a longer range by allowing the read head 150 to collect the codewords over a distance of movement. This requires the microprocessor 430 to collect and store data during movement to emulate a longer read head in memory.

Figure 11:
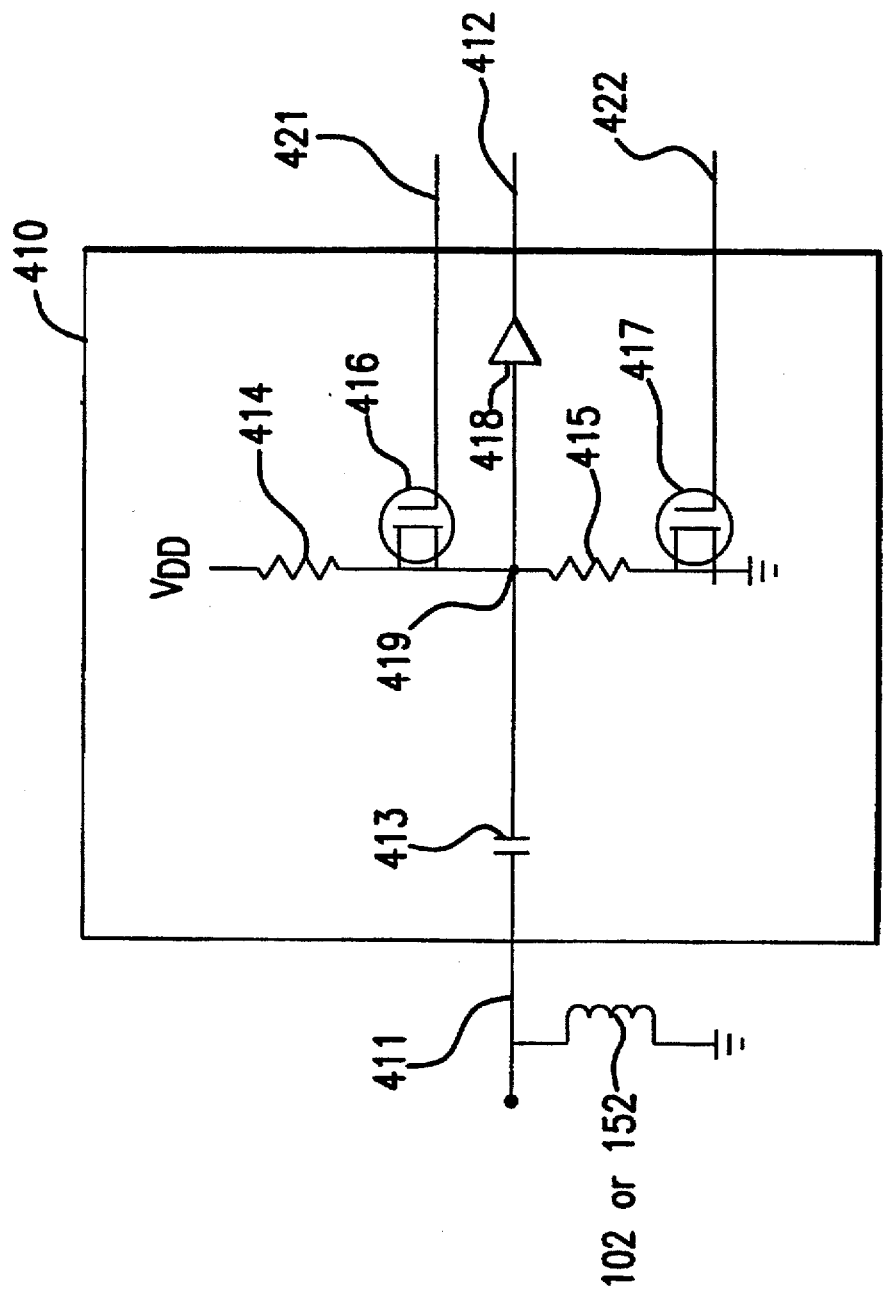
FIG. 11 shows a partial schematic, partial block diagram of the signal generator of FIG. 10.

FIG. 11 shows one preferred embodiment of the signal generator 410 of FIG. 10 that is particularly suitable for low power use, such as for use in the low power induced current position transducers 330 and 360. The signal generator 410 is connected to the transmitter windings 102 or 152 by the signal line 411, and includes a capacitor 413, a pair of resistors 414 and 415, transistors 416 and 417, and a comparator 418, connected as shown.

Figure 12:
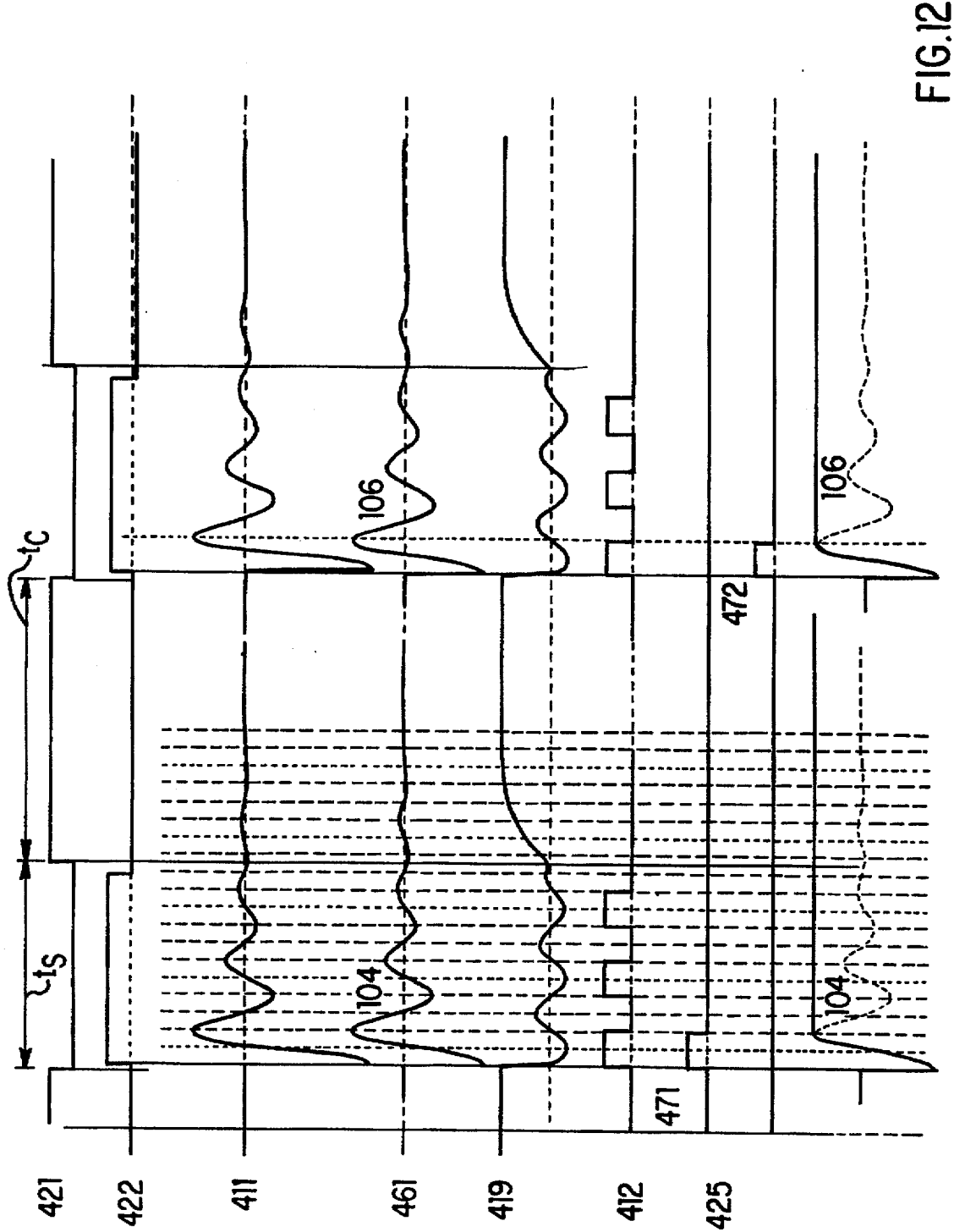
FIG. 12 shows timing diagrams for the signals resulting from the electronics in FIGS. 10 and 11.

As shown in FIG. 12, pulse generating circuits in the digital control unit 420 supply control signal pulses over the signal lines 421 and 422. When the control signal on the signal line 421 is high and the control signal on the signal line 422 is low, the capacitor 413 is charged to the supply voltage $V_{DD}$. $V_{DD}$ is generated from an appropriate power source, such as a battery. When the control signal on the signal line 421 is low and the control signal on the signal line 422 is high, the capacitor 413 discharges. The transmitter winding 102 or 152 and the capacitor 413 form a resonant circuit. Thus, a voltage transient signal 502 is output to the transmitter winding 102 or 152 over the signal line 411 and has a resonant behavior, as shown in the signal shown at 411 of FIG. 12. This transient voltage signal is inductively transmitted by the transmitter winding 102 or 152 to the receiver windings 104 and 106, or 154, respectively produce signals 503.

As shown in FIG. 12, the example timing diagram for the output signal on the signal line 461 from the amplifier 460 shows an output signal from the receiver windings 104 and 106 when the negative polarity subloops 108 are covered by the flux modulators and while the subloops 107 are not covered. Note that the two outputs shown for the signal output on the signal line 461 are only representational and would not actually occur in real time since the receiver windings 104 and 106 are physically positioned so as to produce different output signals.

In FIG. 11, the signal at the node 419 causes the comparator 418 to change its output state whenever this signal passes through a zero voltage value (i.e., a "zero crossing"). The timing diagrams for the signals at the node 419 and the resulting control signal output over the signal line 412 are shown in FIG. 12. As shown in FIG. 12, the digital control unit 420 responds to the first square wave output from the comparator 418 over the signal line 412 to activate the control signal output on the signal line 425. This control signal controls the sample and hold circuits 470 and 480 to store the output signals from the receiver windings 104, 106 or 154. Thus, as shown in the timing diagrams of FIG. 12, as the signal at the node 419 goes through its first zero-crossing, the signal on the signal line 461 is approximately at a peak, according to the resonant nature of the signal generator circuit. That peak is then stored by one of the sample and hold subcircuits 471 or 472. If the signal on the signal line 461 had instead been a signal resulting from a "−" output signal from receiver windings 104 or 106, the signal on the signal line 461 would have been inverted and would have been at a negative peak when sampled. As described in incorporated copending applications JAO 36708 and JAO 36708A, the inductive technology used in the linear encoder with the tape blade 140 may be used in other applications. For example, FIG. 13 shows a tape measure 1100 using a rotary encoder 1160.

Figure 13:
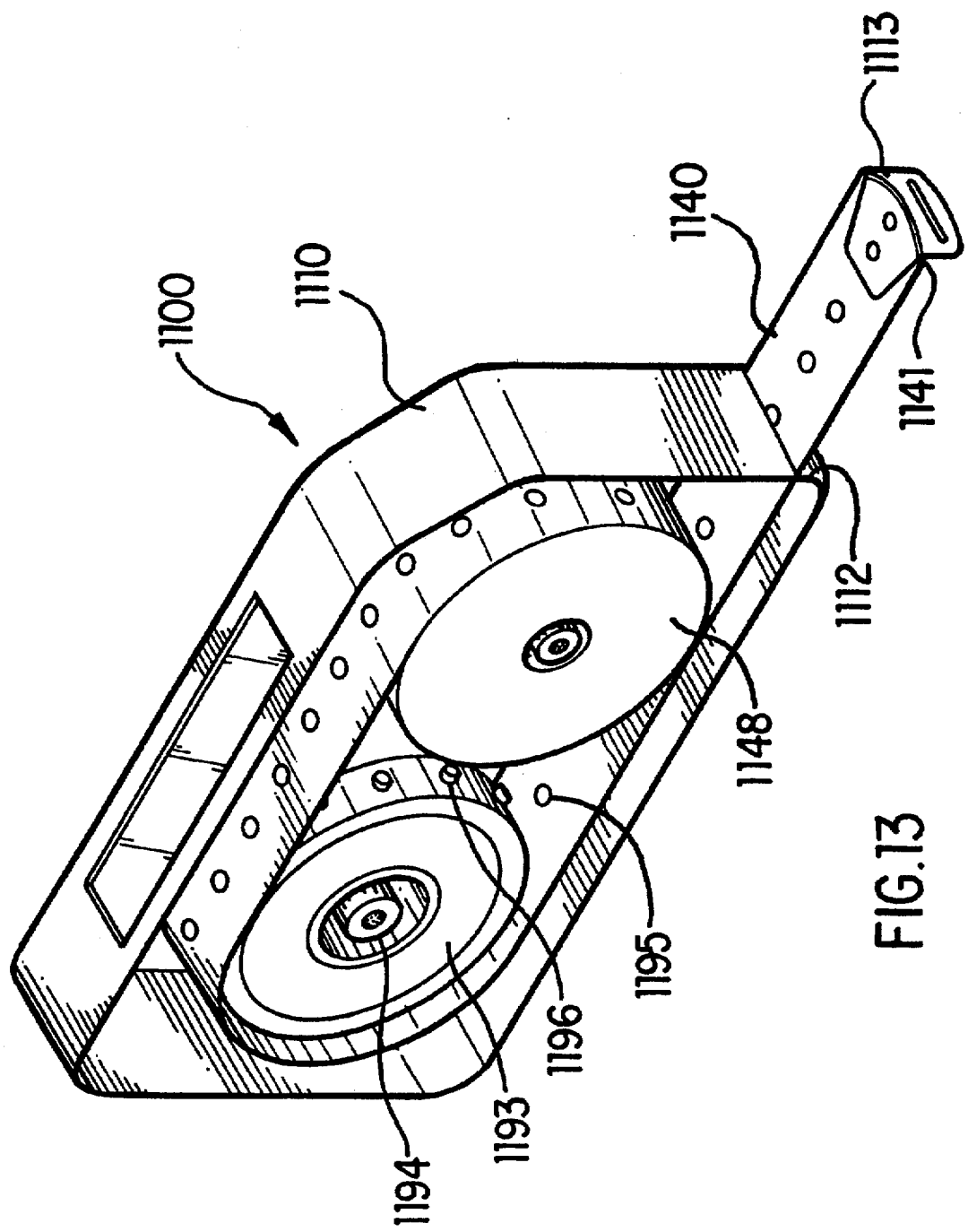
FIG. 13 is a cutaway isometric view of a second preferred embodiment of the electronic tape measure of this invention.

The tape measure 1100, as shown in FIG. 13, includes a housing 1110 and a tape blade 1140. A lateral slot 1112 is positioned at the front end of the housing 1110. The tape blade 1140 is pulled through the lateral slot 1112 from its wound position on a tape reel 1148. A tape end 1141 of the tape 1140 has an end piece 1113 that prevents the tape end 1141 from entering the housing 1110 and that provides a means for extracting the tape blade 1140 from the housing 1110. An encoder spool 1193 is mounted on a shaft 1194 attached to the inside of the housing 1110 and is driven by the tape blade 1140 by holes 1195 in the tape blade 1140 that are engaged by engaging pins 1196 distributed around the circumference of the encoder spool 1193.

Figure 14:
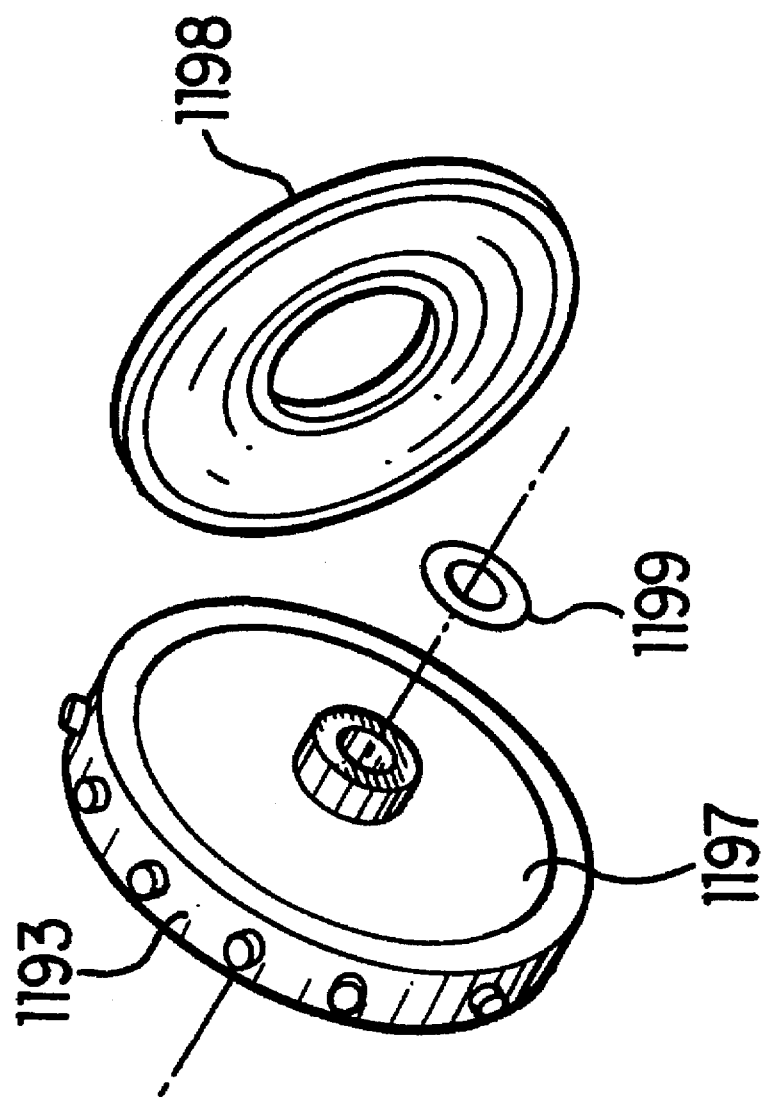
FIG. 14 is an exploded isometric view of the two disk rotary encoder of FIG. 13.

FIG. 14 shows a two disk encoder including a scale disk 1197 and a pickoff disk 1198. The scale disk 1197 is fixed to the rotatable encoder spool 1193. The pickoff disk 1198 is fixed to the housing 1110. The scale disk 1197 and the pickoff disk 1198 have a gap between them that is determined by one or more circular shims 1199. The shims 1199 are placed around the shaft 1194 between the hub of the encoder spool 1193 and the housing 1110. The signal processing and electronic circuit (not shown) of the tape measure 1100 is similar to that shown in FIGS. 10 and 11 for the linear encoder shown in FIGS. 1–9.

Figure 15B:
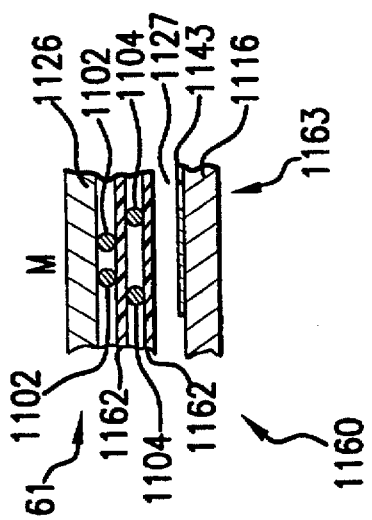
FIG. 15B shows an enlarged cross-sectional view of the rotary encoder of FIG. 15A taken along the line 15B—15B of FIG. 15A.
Figure 15A:
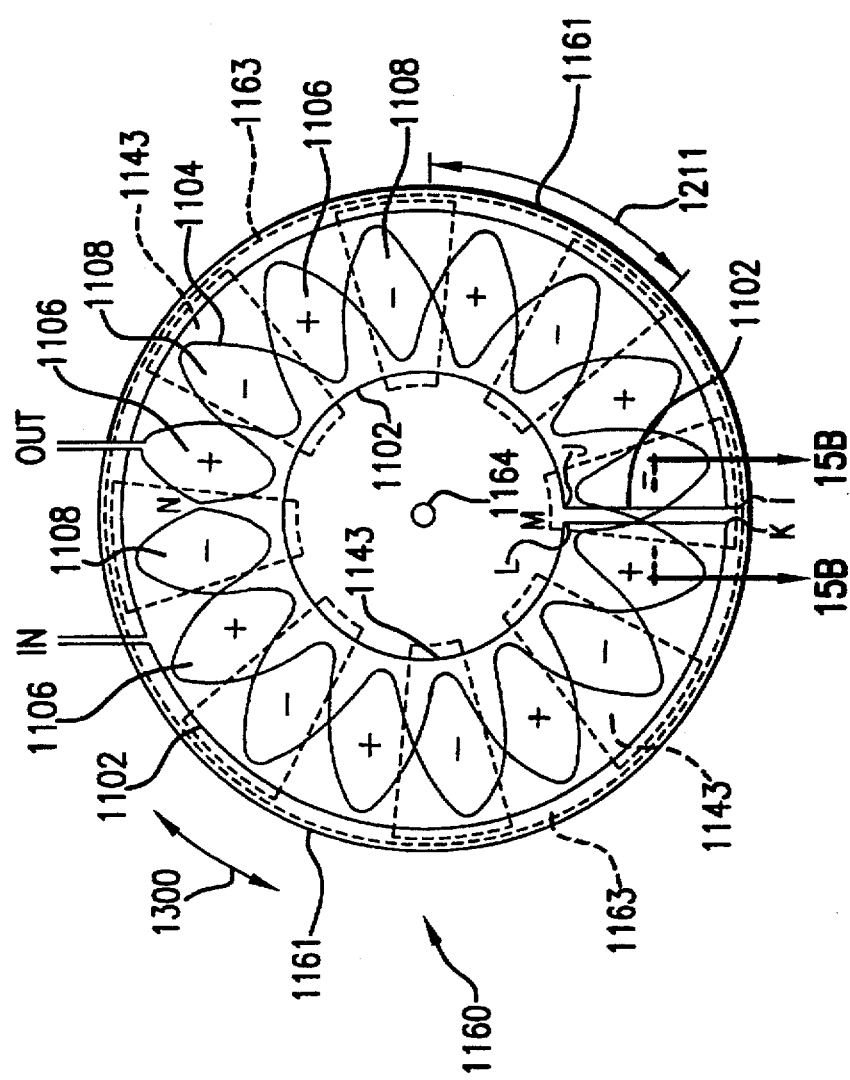
FIG. 15A shows the winding layout of the rotary encoder of FIGS. 13 and 14.

FIGS. 15A and 15B show one preferred embodiment of a rotary encoder 1160. The rotary encoder 1160 includes a stator 1161 which has a transmitter winding 1102 and a receiver winding 1104. The rotary encoder 1160 also has a rotor 1163 that has flux modulators 1143 secured to it (shown in dashed lines in FIG. 15A). The stator 1161 is attached to the pickoff disk 1198 and the rotor 1163 is attached to the scale disk 1197. The transmitter winding 1102 and the receiver winding 1104 of the stator 1161 are formed into a planar ring as if the ends of the windings 102 and 104 of the incremental transducer 330 were curved and bent to meet within a single plane. As shown in FIG. 15A, the ends of the transmitter winding 1102 meet at location M on the stator 1161, while the ends of the receiver winding 1104 meet at location N. Similarly, the rotor 1163 includes the flux modulators 1143 deposited on the rotor, as if the ends of a portion of the incremental scale 310 of the incremental transducer 330 3 were similarly curved and bent to form a disk.

The rotor 1163 rotates about a central point 1164 on the shaft 1194. When the rotor 1163 rotates, the flux modulators 1143 are alternately positioned proximate to the "+" loops 1106 and the "+" loops 1108 in the receiver winding 1104. As with the linear encoder described above, the receiver winding 1104 outputs a changing signal representing the rotational position of the rotor 1163 relative to the stator 1161. The receiver windings 1104 are arranged at an angular wavelength 1211. As the rotor 1163 rotates, its various components move along a circular measuring path 1300.

As shown in FIG. 15B, the receiver winding 1104 and the transmitter winding 1102 are fixed to a suitable disk or ring-shaped substrate 1126, such as a printed circuit board, and are electrically separated by insulating layers 1162 shown in FIG. 15B. The two ends of the transmitter winding 1102 extend parallel to each other (shown as end lines I-J and K-L in FIG. 15A). As a result, edge effects and other magnetic field distortions can occur at location M. Similar edge effects can be created at location N in the receiver windings 1104. Such edge effects can cause distortion in the signal output from the receiver winding 1104.

Consequently, as shown in FIGS. 16A and 16B, a second preferred embodiment of a rotary encoder 1170 eliminates the end point locations M and N by providing "seamless"

transmitter and receiver windings 1102 and 1104. In the rotary encoder 1170, the end lines of the transmitter winding 1102 I-J and K-L are positioned on separate planes, directly above each other, and are separated by a thin insulating layer 1162, as shown in FIG. 16B. As a result, the magnetic fields created by the end lines I-J and K-L cancel (due to current flowing in opposite directions) and thus have no disturbing effect on the output signal from the receiver winding 1104. Additionally, the end portions I-J and K-L of the transmitter winding 1102 are preferably secured on the side of the supporting substrate 1126 opposite to the side on which the receiver windings 1104 are secured, to distance these two end portions and further reduce signal distortion, such as, crosstalk noise.

The receiver winding 1104 of the rotary encoder 1170 can be manufactured by depositing a first sinusoidal winding 1165 on the substrate 1126 and then depositing a second sinusoidal winding 1166 that is 180 degrees out of phase with the first winding. The first and second sinusoidal windings 1165 and 1166 must be insulated from each other to prevent short circuiting between the two windings. The windings 1165 and 1166 are serially connected at points O-P and G-H.

The lines O-P and Q-R are preferably routed in parallel, and are separated by a thin insulation layer. Since current flows in opposite directions between the lines O-P and Q-R, magnetic fields generated by these lines cancel, eliminating noise in the receiver output signal. The lines G-H and E-F for the other lines of the receiver winding 1104, and the lines A-B and C-D for the transmitter winding 1102, are preferably routed in parallel and are separated by thin insulation to similarly cancel magnetic fields and reduce noise. While the rotors 1160 and 1170 show only one receiver winding 1104, an additional receiver winding (not shown) separated by appropriate insulating layers 1162, can be located on the stator 1161 to combine with receiver winding 1104 to produce quadrature output signals.

Figure 17B:
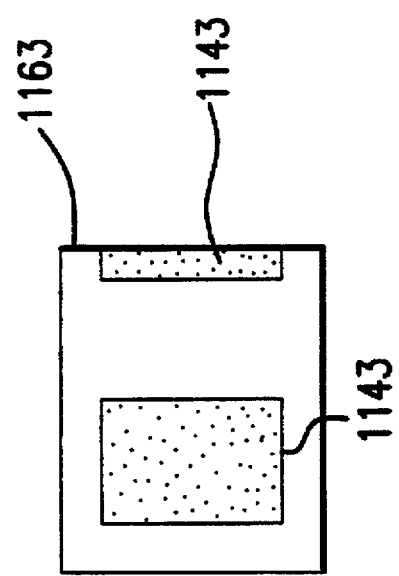
FIG. 17B is a side elevational view of a rotor for the cylindrical rotary encoder of FIG. 17A.
Figure 17A:
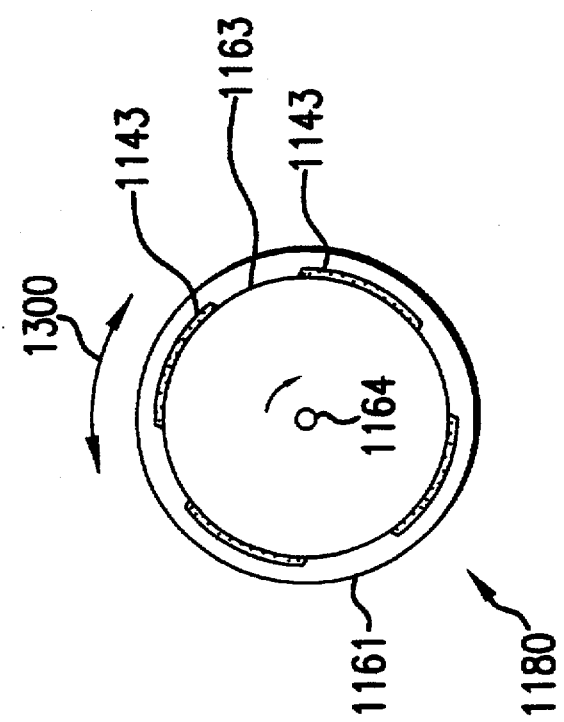
FIG. 17A is a top plan view of a fourth preferred embodiment of the electronic tape measure of this invention, comprising a cylindrical rotary encoder.
Figure 18B:
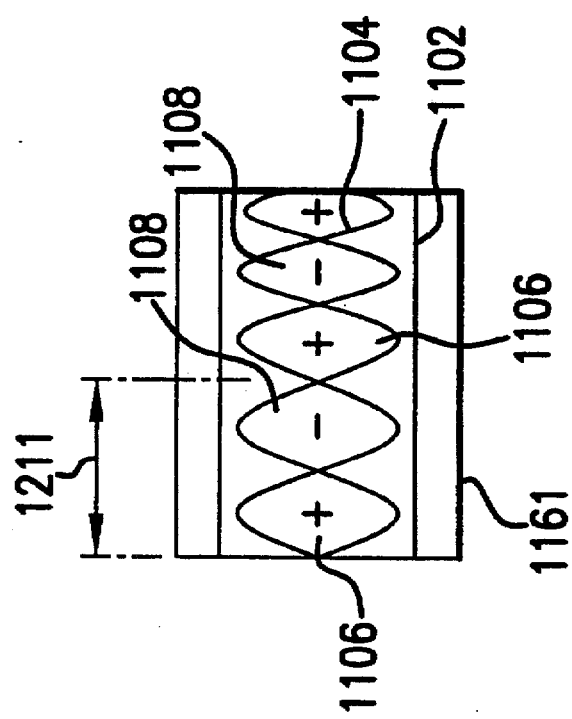
FIG. 18B is a side elevational view of a stator for the cylindrical rotary encoder of FIG. 18A.
Figure 18A:
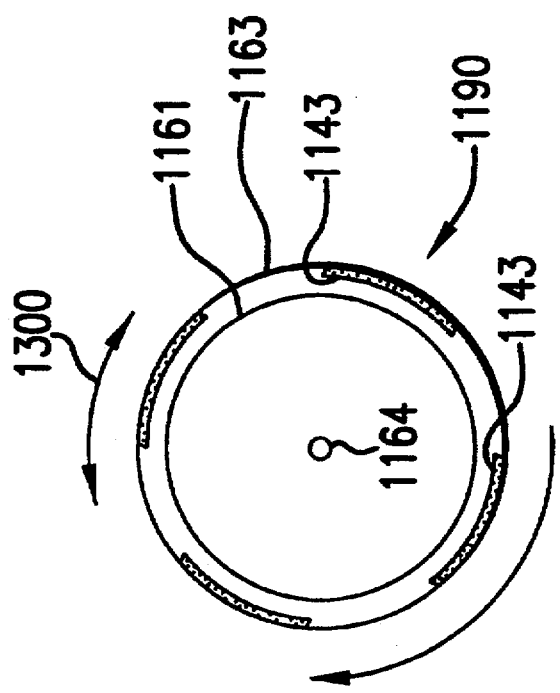
FIG. 18A is a top plan view of a fifth preferred embodiment of the electronic tape measure of this invention, comprising a second cylindrical rotary encoder.

In addition to the rotary encoders 1160 and 1170, the electronic tape measure of this invention could also use a cylindrical rotary encoder. FIG. 17A shows a cylindrical, rotary encoder 1180 having an inner cylindrical rotor 1163 with flux modulators 1143 positioned on its exterior surface. An outer cylindrical stator 1161 includes the transmitter winding 1102 and the receiver winding 1104 positioned on its interior surface. Similarly, FIG. 18A shows a cylindrical rotary encoder 1190 having an inner cylindrical stator 1161. The cylindrical stator 1161 has the transmitter winding 1102 and the receiver winding 1104 affixed to its exterior surface, as shown in FIG. 18B. The rotary encoder 1190 also has an outer cylindrical rotor 1163. The rotor 1163 has flux modulators 1143 secured to its interior surface. The stators 1161 of the cylindrical rotary encoder 1180 and 1190 are formed as if the ends of the read head 150 were curved and bent to meet in a plane perpendicular to the plane of FIG. 3. Similarly, the rotors 1163 of the cylindrical rotary encoders 1180 and 1190 are formed as if the ends of a portion of the scale 140 were bent to meet in a plane perpendicular to the plane of FIG. 3.

As described above with respect to the rotary encoders 1160 and 1170, the cylindrical rotary encoders 1180 and 1190 generate a magnetic field from the transmitter winding 1102 while rotating the rotor 1163 about the point 1164. The flux modulators 1143 are alternately located proximate to the "+" loops 1106 and the "−" loops 1108 of the receiver winding 1104 to produce a varying output signal from the receiver winding 1104. The cylindrical rotary encoders 1180 and 1190 could also be driven by a means similar to the encoder spool 1193 and engaging pins 1196 shown in FIG. 13.

In addition, those skilled in the art will recognize, based on the detailed description set forth above, that by forming the read head 150 and scale 140 of FIG. 3 on flexible circuit materials, such flexible materials could be affixed to transducers having other shapes. For example, the flexible materials could be lengthwise wrapped around a cylindrical measuring rule, or portions of a cylindrical object such as a measuring "rope", whose axis is parallel to the measuring axis 220. Therefore, the linear encoders could be constructed in a relatively cylindrical configuration which moves parallel to the measuring axis, as opposed to the cylindrical configurations shown in FIGS. 17A and 18A which rotate.

It should also be appreciated that, in a further embodiment of the invention, the inductive coupling can be established between the transmitter winding(s), the receiver winding(s) and the scale. In this embodiment, the receiver windings are moved from within the transmitter winding(s) to adjacent the transmitter winding(s). In addition, the scale elements, rather than being flux modulators, as explained above, are closed loop conductor paths, or coupling loops, that extend under both the transmitter winding(s) and the receiver winding(s). The coupling loops are inductively coupled to the transmitter winding(s), and the receiver windings are inductively coupled to the coupling loops. The coupling loops overlap portions of the transmitter winding(s). The magnetic field(s) generated by the transmitter windings induces currents to flow around the coupling loops. The induced currents in the coupling loops generate secondary magnetic fields. The loops extend perpendicularly to the measuring axis to overlap portions of the receiver windings. The secondary magnetic fields thus induce EMFs in the receiver windings. If the field generating area or the receiver winding area overlapping the coupling loops varies as a function of position along the measuring axis, then the signals from the receiver windings will vary as a function of position.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An electronic tape measure, comprising:

a tape housing;

a tape member having a measuring axis, the tape member mounted in the tape housing and extendible from the tape housing; and at least one inductive position transducer, each inductive position transducer comprising a read head member connected to the tape housing and a scale member positioned on the tape member, the read head member comprising:

at least one magnetic field generator, each magnetic field generator generating a changing magnetic flux in a flux region in response to a drive signal, and at least one magnetic flux sensor responsive to the changing magnetic flux; and the scale member comprising at least one flux modulator, each flux modulator positionable within the flux region and capable of altering the changing magnetic flux within a modulation region proximate to the flux modulator;

wherein each magnetic flux sensor generates an output signal indicative of a relative position between the magnetic flux sensor and at least one of the at least one flux modulator.

2. The electronic tape measure of claim 1, wherein the at least one magnetic flux sensor is positioned within the flux region.

3. The electronic tape measure of claim 2, wherein each of the at least one flux modulator comprises one of a flux disrupter and a flux enhancer.

4. The electronic tape measure of claim 2, wherein each magnetic field generator and each magnetic flux sensor form a continuous spatially modulated inductive coupling.

5. The electronic tape measure of claim 1, wherein at least one of each magnetic flux sensor and each magnetic field generator is formed in an alternating pattern of polarity regions.

6. The electronic tape measure of claim 5, wherein the alternating pattern of polarity regions comprises sinusoidally shaped areas bounded by conductive elements.

7. The electronic tape measure of claim 1, wherein in the absence of the at least one flux modulator, the output signal generated by each magnetic flux sensor is insensitive to the changing magnetic flux generated by each magnetic field generator.

8. The electronic tape measure of claim 1, wherein each magnetic field generator includes a field generating conductor and each magnetic flux sensor includes a sensing conductor, the field generating conductor of each magnetic field generator and the sensing conductor of each magnetic flux sensor positioned within a thin zone.

9. The electronic tape measure of claim 1, further comprising:
    a low power energy supply source outputting a power supply;
    a drive circuit inputting the power supply and outputting a drive signal to at least one of the at least one magnetic field generator during each measurement cycle; and
    an analyzing circuit inputting the output signal from at least one of the at least one magnetic field sensor and outputting a signal related to a length of the tape member extending outside the housing at a first level of resolution.

10. The electronic tape measure of claim 9, wherein the drive circuit comprises a capacitor discharged through the at least one field generating conductor of the at least one magnetic field generator.

11. The electronic tape measure of claim 10, wherein the capacitor and the at least one field generating conductor of the at least one magnetic field generator form a resonant circuit.

12. The electronic tape measure of claim 11, wherein the capacitor is disconnected from the magnetic field generator in close proximity to a resonant peak of the resonant circuit.

13. The electronic tape measure of claim 9, wherein the drive signal is an intermittent drive signal.

14. The electronic tape measure of claim 13, wherein the intermittent drive signal comprises at least one pulse signal.

15. The electronic tape measure of claim 9, wherein the energy supply source is a self-contained, low-power energy supply source.

16. The electronic tape measure of claim 9, wherein the low-power energy supply source is at least one of a battery and a solar cell.

17. The electronic tape measure of claim 9, wherein an average current of at most 75 µA is supplied from the low-power energy supply source to the drive circuit.

18. The electronic tape measure of claim 1, wherein the changing magnetic flux generated by the at least one magnetic field generator changes at a rate equivalent to an oscillation frequency of at least 1 MHz.

19. The electronic tape measure of claim 1, wherein the at least one inductive position transducer comprises an incremental inductive position transducer and an inductive absolute position transducer.

20. The electronic tape measure of claim 19, wherein:
    the read head member of the incremental inductive position transducer comprises:
        a magnetic field generator generating a changing magnetic flux in a flux region in response to the drive signal, and
        a pair of magnetic flux sensors, each magnetic flux sensor defining a periodic pattern of alternating polarity loops, the periodic pattern having a wavelength, the pair of magnetic flux sensors offset along the measuring axis by one-quarter of the wavelength; and
    the scale member of the incremental inductive position transducer comprises a plurality of flux modulator, each flux modulator having a length extending along the measuring axis equal to one-half the wavelength.

21. The electronic tape measure of claim 19, wherein:
    the read head member of the inductive absolute position transducer comprises:
        a magnetic field generator generating, a changing magnetic flux in a flux region in response to the drive signal, and
        a plurality of magnetic flux sensors, each magnetic flux sensor including a positive polarity loop and a negative polarity loop and extending in a direction perpendicular to the measuring axis; and
    the scale member of the inductive absolute position transducer comprises a plurality of flux modulators extending along the tape member and defining a code track, the code track comprising a plurality of multibit code words, each code word defining a unique position on the tape.

22. The electronic tape measure of claim 1, wherein:
    the at least one flux modulator comprises a plurality of coupling loops;
    at least one of each magnetic field generator and each magnetic flux sensor is formed in a spatially modulated pattern extending along the measuring axis;
    the at least one magnetic field generator is inductively coupled to at least a first portion of at least one of the plurality of coupling loops and the at least one magnetic flux sensor is inductively coupled to at least a second portion of the at least one coupling loop, the changing magnetic flux proximate to at least the second portion of the at least one coupling loop is such that the at least one coupling loop modulates the inductive coupling between the at least one magnetic field generator and the at least one magnetic flux sensor; and
    substantially no direct inductive coupling between the at least one magnetic field generator and the at least one magnetic flux sensor is present.

23. An electronic inductive tape measure comprising:
    a tape housing;
    a tape member having a measuring axis, the tape member mounted in the tape housing and extendible from the tape housing; and
    an energy supply source providing a power supply to a drive circuit;
    the drive circuit inputting the power supply and outputting a drive signal;

at least one inductive position transducer inputting the drive signal and outputting at least one sensed signal; and an analyzing circuit inputting the at least one sensed signal and outputting an output signal related to a length of the tape member extending outside the housing at a first level of resolution.

24. The electronic tape measure of claim 23, wherein the drive circuit comprises a capacitor discharged through the inductive transducer.

25. The electronic tape measure of claim 24, wherein the capacitor and the inductive transducer form a resonant circuit.

26. The electronic tape measure of claim 25, wherein the capacitor is disconnected from the inductive transducer in close proximity to a resonant peak of the resonant circuit.

27. The electronic tape measure of claim 23, wherein a magnetic field of the inductive transducer changes at a rate equivalent to an oscillation frequency of at least 1 MHz in response to the drive signal.

28. The electronic tape measure of claim 23, wherein the drive signal is an intermittent drive signal.

29. The electronic tape measure of claim 28, wherein the intermittent drive signal comprises at least one pulse signal.

30. The electronic tape measure of claim 23, wherein each inductive position transducer comprises a read head member positioned within the tape housing and a scale member positioned on the tape member; and, the read head member comprising:

at least one magnetic field generator, each magnetic field generator generating a changing magnetic flux in a flux region in response to a drive signal, and at least one magnetic flux sensor responsive to the changing magnetic flux; and the scale member comprising at least one flux modulator, each flux modulator positionable within the flux region and capable of varying the changing magnetic flux within a modulation region proximate to the flux modulator;

wherein each magnetic flux sensor generates an output signal indicative of a relative position between the magnetic flux sensor and at least one of the at least one flux modulator.

31. The electronic tape measure of claim 30, wherein at least one of each magnetic flux sensor and each magnetic field generator is formed in an alternating pattern of polarity regions.

32. The electronic tape measure of claim 31, wherein the alternating pattern of polarity regions comprises sinusoidally shaped areas bounded by conductive elements.

33. The electronic tape measure of claim 30, wherein in the absence of the at least one flux modulator, the output signal generated by each magnetic flux sensor is insensitive to the changing magnetic flux generated by each magnetic field generator.

34. The electronic tape measure of claim 30, wherein each of the at least one flux modulator comprises one of a flux disrupter and a flux enhancer.

35. The electronic tape measure of claim 30, wherein each magnetic field generator includes a field generating conductor and each magnetic flux sensor includes a sensing conductor, the field generating conductor of each magnetic field generator and the sensing conductor of each magnetic flux sensor positioned within a thin zone.

36. The electronic tape measure of claim 30, wherein each magnetic field generator and each magnetic flux sensor form a continuous spatially modulated inductive coupling.

37. The electronic tape measure of claim 30, wherein the at least one inductive position transducer comprises an incremental inductive position transducer and an inductive absolute position transducer.

38. The electronic tape measure of claim 37, wherein:

the read head member of the incremental inductive position transducer comprises:

a magnetic field generator generating a changing magnetic flux in a flux region in response to the drive signal, and a pair of magnetic flux sensors, each magnetic flux sensor defining a periodic pattern of alternating polarity loops, the periodic pattern having a wavelength, the pair of magnetic flux sensors offset along the measuring axis by one-quarter of the wavelength; and the scale member of the incremental inductive position transducer comprises a plurality of flux modulator, each flux modulator having a length extending along the measuring axis equal to one-half the wavelength.

39. The electronic tape measure of claim 37, wherein:

the read head member of the inductive absolute position transducer comprises:

a magnetic field generator generating a changing magnetic flux in a flux region in response to the drive signal, and a plurality of magnetic flux sensors, each magnetic flux sensor including a positive polarity loop and a negative polarity loop and extending in a direction perpendicular to the measuring axis; and the scale member of the inductive absolute position transducer comprises a plurality of flux modulators extending along the tape member and defining a code track, the code track comprising a plurality of multibit code words, each code word defining a unique position on the tape.

40. The electronic tape measure of claim 23, wherein each inductive position transducer comprises a read head member positioned within the tape housing and a scale member positioned on the tape member, the read head member comprising:

at least one magnetic field generator, each magnetic field generator generating a first changing magnetic flux in a first flux region in response to a drive signal;

a scale member comprising at least one scale loop, each scale loop having a first portion within one of the first flux region and a second portion extending beyond the first flux region, the scale member responsive to the first changing magnetic flux to generate a second changing magnetic flux in a second flux region; and at least one magnetic flux sensor, each magnetic flux sensor positionable within the second flux region and sensing the second changing magnetic flux, wherein each magnetic flux sensor generates an output signal indicative of a relative position between the magnetic flux sensor and the at least one scale loop.

41. The electronic tape measure of claim 23, wherein the energy supply source is a self-contained, low power energy supply source.

42. The electronic inductive tape measure of claim 41, wherein the low-power energy supply source is at least one of a battery and a solar cell.

43. The electronic tape measure of claim 41, wherein an average current of at most 75 µA is supplied from the low-power energy supply source to the drive circuit.

44. The electronic tape measure of claim 23, wherein:

the tape member is wound around a tape reel and the tape reel rotatably mounted in the tape housing; and the inductive position transducer comprises:

a read head disk attached to one of the tape housing and the tape reel and comprising:

at least one magnetic field generator, each magnetic field generator generating a changing magnetic flux in a flux region in response to a drive signal, and at least one magnetic flux sensor responsive to the changing magnetic flux; and a scale disk attached to the other of the tape housing and the tape reel and comprising at least one flux modulator, each flux modulator positionable within the flux region and capable of varying the changing magnetic flux within a modulation region proximate to the flux modulator;

wherein each magnetic flux sensor generates an output signal indicative of a relative position between the at least one magnetic flux sensor and the at least one flux modulator.

45. The electronic tape measure of claim 23, wherein:

the tape member is wound around a tape reel and the tape reel rotatably mounted in the tape housing; and the inductive position transducer comprises:

a first cylindrical member coupled to one of the tape housing and the tape reel and comprising:

at least one magnetic field generator, each magnetic field generator generating a changing magnetic flux in a flux region in response to a drive signal, and at least one magnetic flux sensor responsive to the changing magnetic flux; and a second cylindrical member connected to the other of the tape housing and the tape reel and comprising at least one flux modulator, each flux modulator positionable within the flux region and capable of varying the changing magnetic flux within a modulation region proximate to the flux modulator;

wherein each magnetic flux sensor generates an output signal indicative of a relative position between the at least one magnetic flux sensor and the at least one flux modulator.

46. The electronic tape measure of claim 23, wherein the electronic tape measure draws at most an average current of 200 μA.

47. An electronic tape measure, comprising:

a tape housing;

a tape member having a measuring axis, the tape member wound around a tape reel, the tape reel rotatably mounted in the tape housing, and the tape extendible from the housing; and an inductive position transducer comprising:

a read head disk attached to one of the tape housing and the tape reel and comprising:

at least one magnetic field generator, each magnetic field generator generating a changing magnetic flux in a flux region in response to a drive signal, and at least one magnetic flux sensor responsive to the changing magnetic; and a scale disk attached to the other of the tape housing and the tape reel and comprising at least one flux modulator, each flux modulator positionable within the flux region and capable of varying the changing magnetic flux within a modulation region proximate to the flux modulator;

wherein each magnetic flux sensor generates an output signal indicative of a relative position between the at least one magnetic flux sensor and the at least one flux modulator.

48. An electronic tape measure, comprising:

a tape housing;

a tape member having a measuring axis, the tape member wound around a tape reel, the tape reel rotatably mounted in the tape housing, and the tape extendible from the housing; and an inductive position transducer comprising:

a first cylindrical member coupled to one of the tape housing and the tape reel and comprising:

at least one magnetic field generator, each magnetic field generator generating a changing magnetic flux in a flux region in response to a drive signal, and at least one magnetic flux sensor responsive to the changing magnetic; and a second cylindrical member connected to the other of the tape housing and the tape reel and comprising at least one flux modulator, each flux modulator positionable within the flux region and capable of varying the changing magnetic flux within a modulation region proximate to the flux modulator;

wherein each magnetic flux sensor generates an output signal indicative of a relative position between the at least one magnetic flux sensor and the at least one flux modulator.

* * * * *